US011279293B2

United States Patent
Razvi et al.

(10) Patent No.: US 11,279,293 B2
(45) Date of Patent: Mar. 22, 2022

(54) VEHICLE INTERIOR COMPONENT

(71) Applicant: Shanghai Yanfeng Jinqiao Automotive Trim Systems Co. Ltd., Novi, MI (US)

(72) Inventors: Syed Razvi, Pune (IN); Thomas Scott Hodgson, Holland, MI (US); Michael Robert Catlin, Holland, MI (US); Jiunn Tyng Chen, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 99 days.

(21) Appl. No.: 16/863,173

(22) Filed: Apr. 30, 2020

(65) Prior Publication Data

US 2020/0254936 A1 Aug. 13, 2020

Related U.S. Application Data

(63) Continuation-in-part of application No. PCT/US2018/058780, filed on Nov. 1, 2018.

(60) Provisional application No. 62/580,741, filed on Nov. 2, 2017.

(51) Int. Cl.
*B60R 7/04* (2006.01)
*E05B 83/32* (2014.01)

(52) U.S. Cl.
CPC ............... *B60R 7/04* (2013.01); *E05B 83/32* (2013.01); *E05Y 2900/538* (2013.01)

(58) Field of Classification Search
CPC ...... B60R 7/04; E05B 83/32; E05Y 2900/538
USPC .................... 296/24.34, 37.8, 1.09
See application file for complete search history.

(56) References Cited

U.S. PATENT DOCUMENTS

| 4,146,159 | A | * | 3/1979 | Hemmen | ............... B60N 3/002 |
| | | | | | 224/275 |
| 4,796,791 | A | | 1/1989 | Goss et al. | |
| 5,282,556 | A | * | 2/1994 | Bossert | .................... B60R 7/04 |
| | | | | | 224/281 |

(Continued)

FOREIGN PATENT DOCUMENTS

WO 2014124479 A1 8/2014

OTHER PUBLICATIONS

International Search Report and Written Opinion from the International Search Authority for International Patent Application No. PCT/US2018/058780 dated Jan. 15, 2019 (in English) (12 pages).

*Primary Examiner* — D Glenn Dayoan
*Assistant Examiner* — E Turner Hicks

(57) ABSTRACT

A vehicle interior component comprising a bin moveable relative to a base is disclosed. The bin may provide a closed position and an open position for bin access. The open position may comprise a side access state and an end access state comprising a front access state and/or a rear access state. The bin may move laterally relative to the base to provide the end access state. The bin may pivot relative to the base to provide the side access state. The component may comprise a carrier for the bin to extend relative to the base to provide the front access state. The base may comprise an end door assembly to open for the bin in the end access state. The bin may pivot with a side door assembly in the side access state. The component may comprise a console; floor console; center console; or storage compartment.

20 Claims, 13 Drawing Sheets

(56) References Cited

U.S. PATENT DOCUMENTS

| | | | | |
|---|---|---|---|---|
| 6,161,896 | A * | 12/2000 | Johnson | B60R 7/043 |
| | | | | 297/188.08 |
| 6,386,612 | B2 * | 5/2002 | Hofmann | B60R 7/043 |
| | | | | 224/275 |
| 6,588,821 | B2 * | 7/2003 | Worrell | B60N 2/26 |
| | | | | 224/275 |
| 7,011,273 | B1 | 3/2006 | Stanford | |
| 7,048,320 | B2 * | 5/2006 | Rubel | B60R 7/02 |
| | | | | 296/37.6 |
| 8,196,985 | B2 * | 6/2012 | Penner | B60R 7/04 |
| | | | | 296/24.34 |
| 9,950,674 | B1 * | 4/2018 | Kalergis | B60N 2/305 |
| 10,576,918 | B2 * | 3/2020 | Ranganathan | B60N 3/10 |
| 10,625,680 | B1 * | 4/2020 | Koehler | B60R 11/00 |
| 10,875,458 | B2 * | 12/2020 | Persson | B60R 7/06 |
| 10,946,802 | B2 * | 3/2021 | Harris | B60R 7/04 |
| 2002/0140246 | A1 | 10/2002 | Worrell et al. | |
| 2008/0179906 | A1 * | 7/2008 | Agarwal | B60R 11/06 |
| | | | | 296/24.34 |
| 2010/0078954 | A1 * | 4/2010 | Liu | B60N 2/793 |
| | | | | 296/24.34 |
| 2016/0272120 | A1 | 9/2016 | Johnston et al. | |
| 2017/0291553 | A1 | 10/2017 | Hellman et al. | |

\* cited by examiner

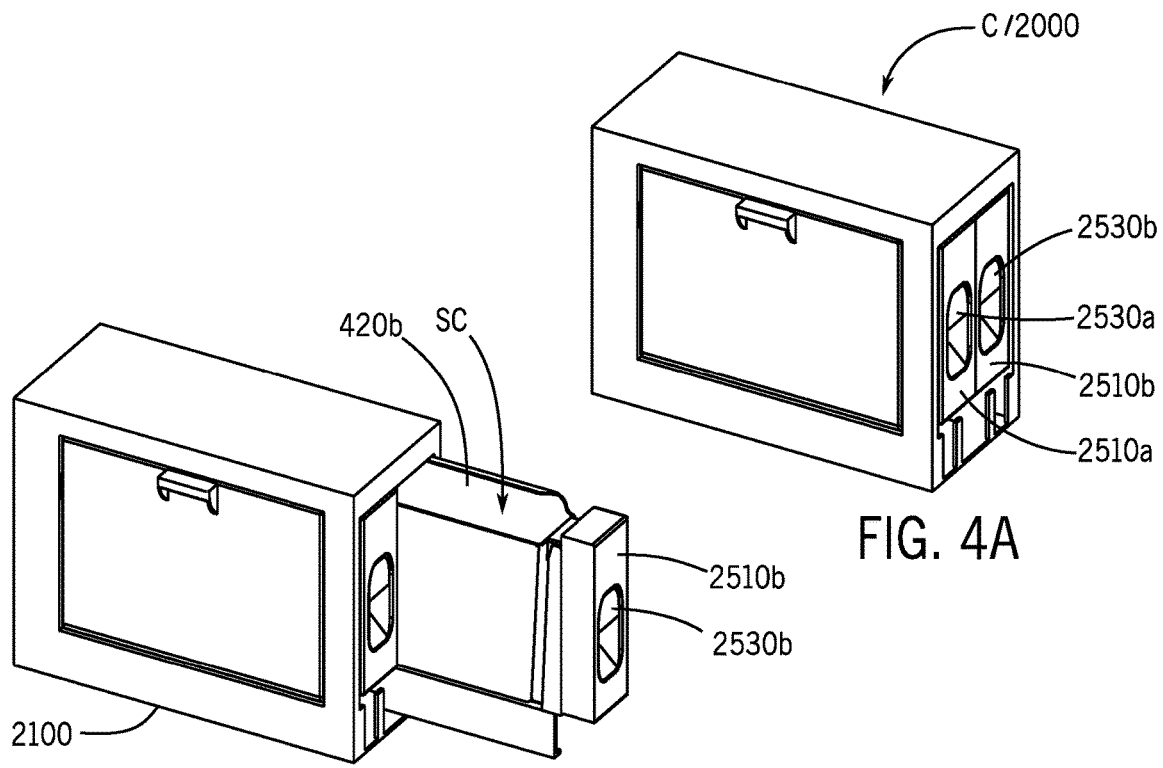
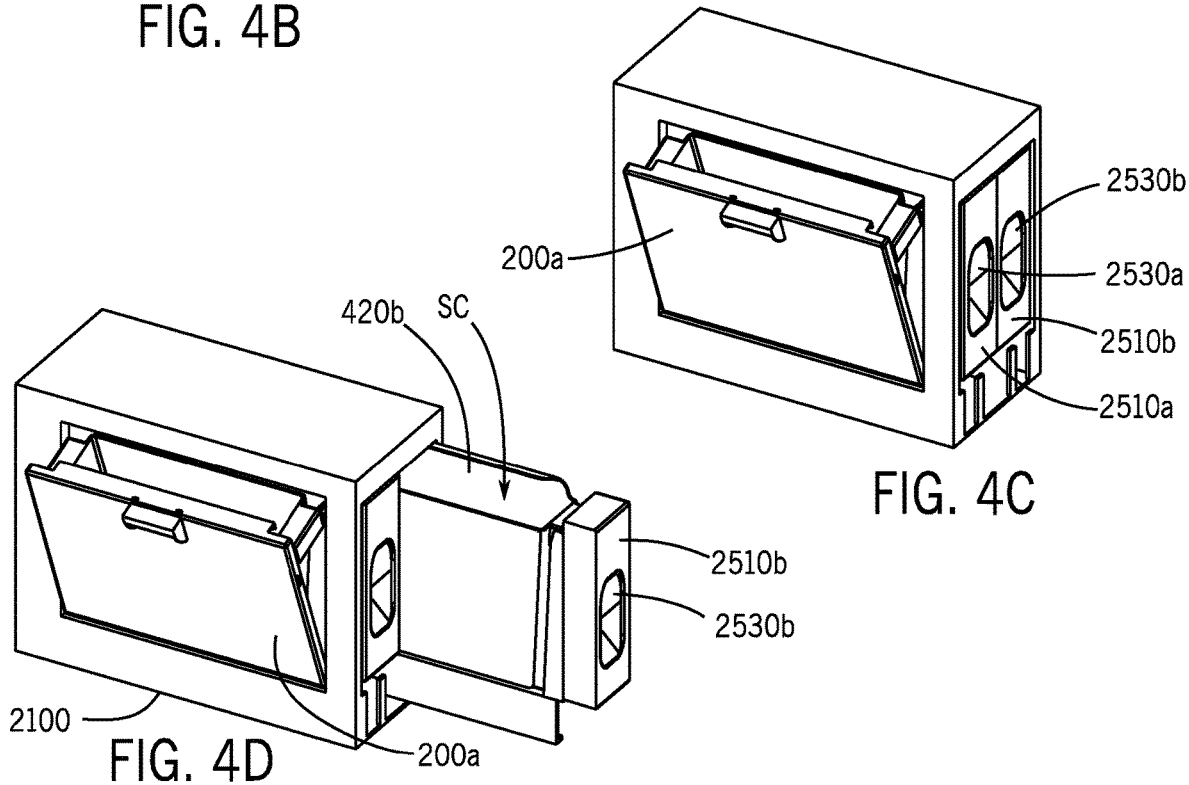

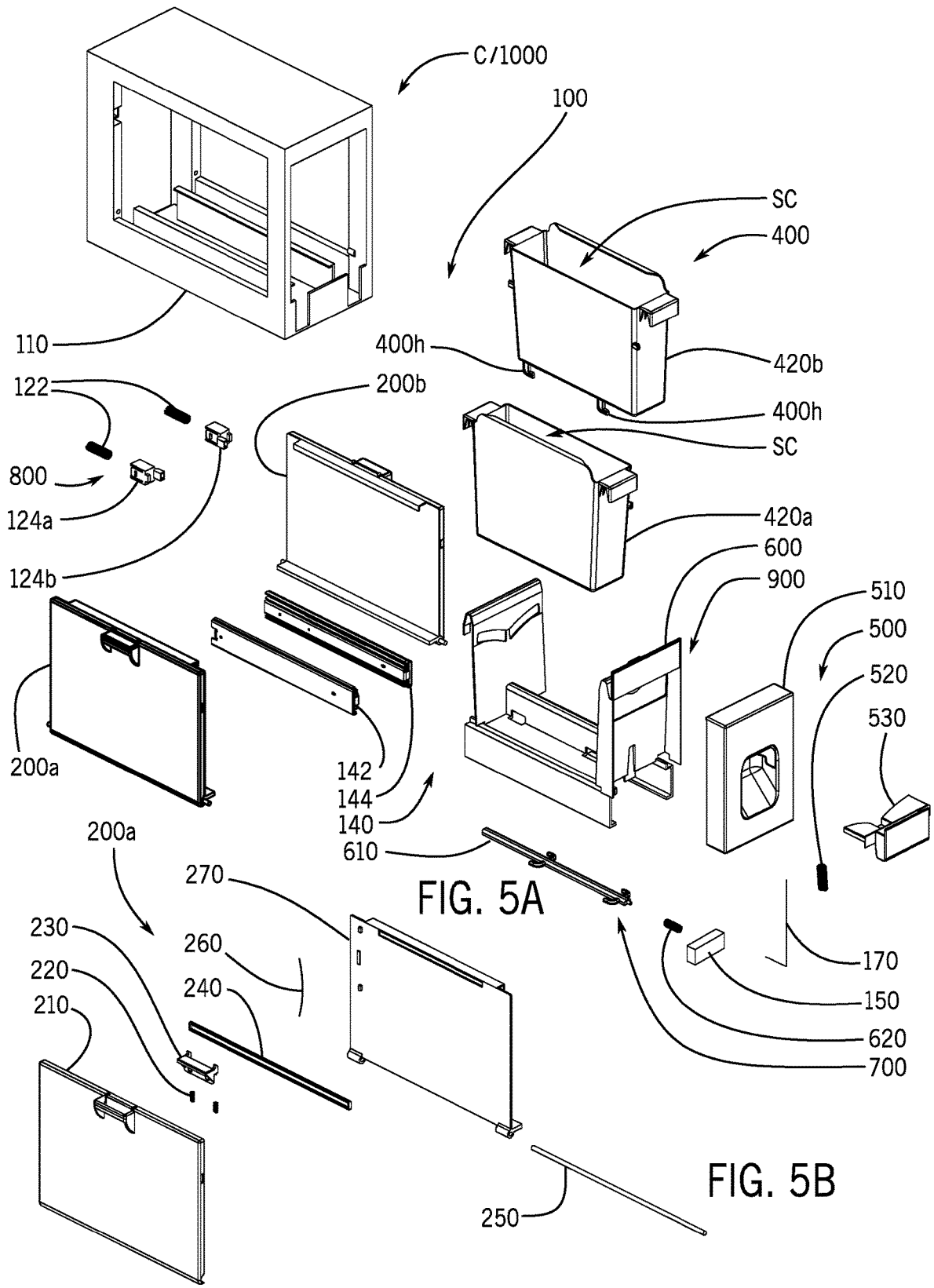

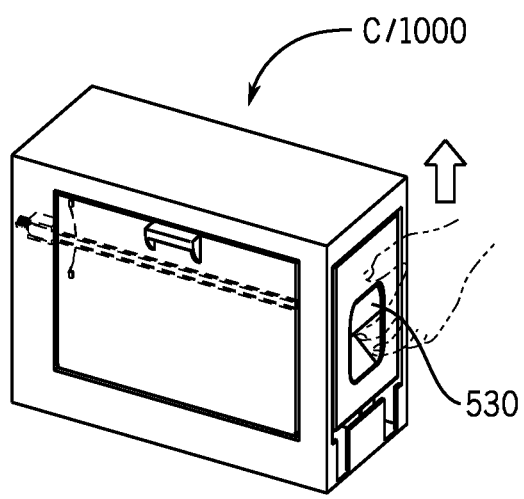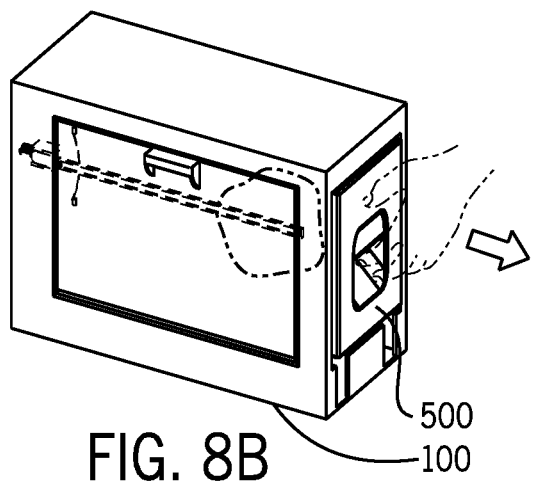
FIG. 8A  FIG. 8B
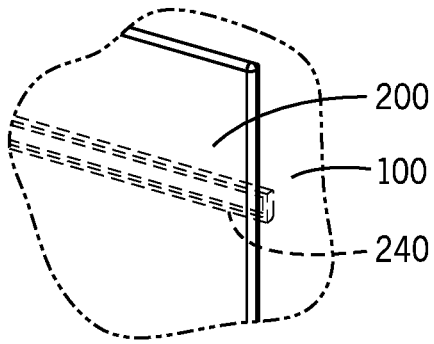
FIG. 8C
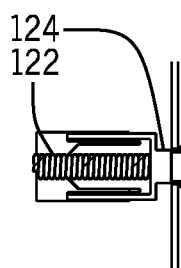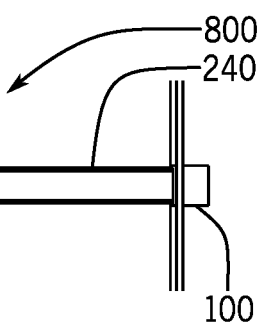
FIG. 8D
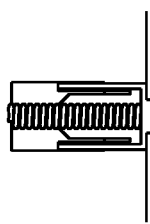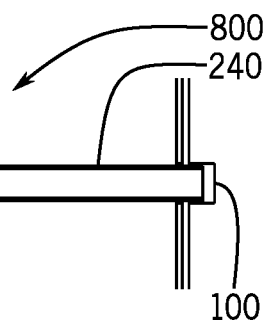
FIG. 8E

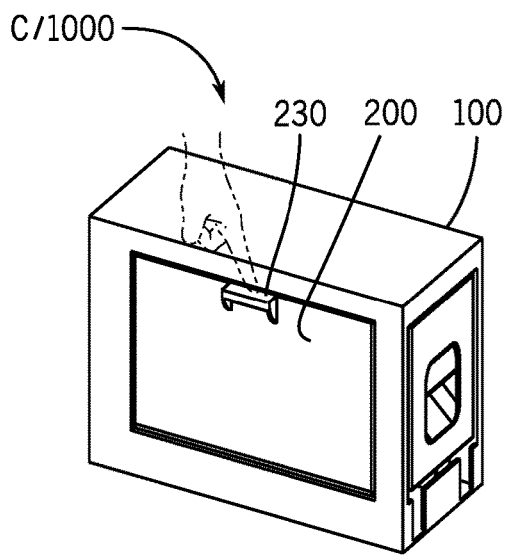
FIG. 10A
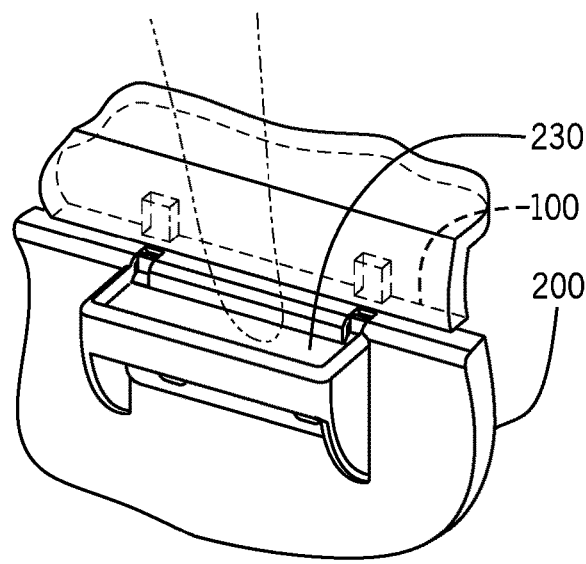
FIG. 10B
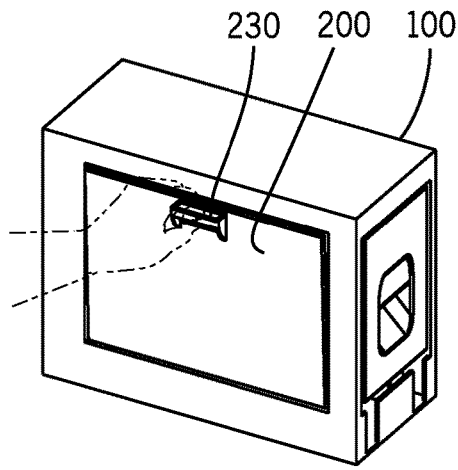
FIG. 10C
FIG. 10D
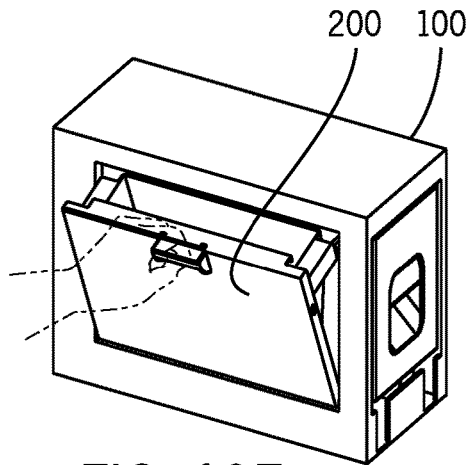
FIG. 10E

VEHICLE INTERIOR COMPONENT

CROSS-REFERENCE TO RELATED APPLICATIONS

The present application is a continuation-in-part of PCT/International Patent Application No. PCT/US2018/058780 titled "VEHICLE INTERIOR COMPONENT" filed Nov. 1, 2018, which claims the benefit of U.S. Provisional Patent Application No. 62/580,741 titled "CONSOLE ASSEMBLY FOR VEHICLE INTERIOR" filed Nov. 2, 2017.

The present application claims priority to and incorporates by reference in full the following patent applications: (a) U.S. Provisional Patent Application No. 62/580,741 titled "CONSOLE ASSEMBLY FOR VEHICLE INTERIOR" filed Nov. 2, 2017; (b) PCT/International Patent Application No. PCT/US2018/058780 titled "VEHICLE INTERIOR COMPONENT" filed Nov. 1, 2018.

FIELD

The present invention relates to a vehicle interior component.

BACKGROUND

It is well known to provide in a vehicle interior a component comprising a base with a bin movable relative to the base to facilitate access to the bin.

It would be advantageous to provide an improved vehicle interior component configured for improved functionality and operation comprising features (and combinations of features) as shown and described in the present application including features to provide multiple ways to move the bin relative to the base for access to the bin.

SUMMARY

The present invention relates to a vehicle interior component comprising a base and a bin configured for (a) a first state with the bin secured to the base in a closed position and (b) a second state with the bin moveable relative to the base. The bin may be configured to move (1) in a first direction relative to the base from the closed position to a first open position and (2) in a second direction relative to the base from the closed position to a second open position. The bin may be configured to slide in the first direction and to rotate in the second direction. The component may comprise a carrier movable between a closed position and an open position relative to the base. The bin may be configured to move with the carrier in the first direction between the closed position of the carrier and the open position of the carrier. The bin may be configured to move relative to the carrier between the closed position of the bin and the second open position of the bin. The component may comprise a mechanism; the mechanism may be configured (a) to allow movement of the bin between the closed position of the bin and the second open position of the bin when the carrier is in the closed position and (b) to block movement of the bin relative to the carrier when the carrier is in the open position of the carrier. The bin may comprise at least one hook; the at least one hook may be configured to couple the bin to the carrier as the carrier moves from the closed position of the carrier toward the open position of the carrier. The component may comprise a mechanism; the mechanism may be configured to block movement of the bin between the closed position of the bin and the second open position of the bin when the carrier moves from the closed position of the carrier toward the open position of the carrier. The component may comprise at least one of (a) a console; (b) a floor console; (c) a center console; (d) a storage compartment.

The present invention relates to a vehicle interior component comprising a base and a bin configured for (a) a first state with the bin secured to the base in a closed position and (b) a second state with the bin moveable relative to the base. The bin may be configured (1) to slide relative to the base between the closed position and a translated position and (2) to rotate relative to the base between the closed position and a rotated position. The component may comprise a carrier movable between a closed position and an open position relative to the base; the carrier may be configured to slide relative to the base; the bin may be configured to move with the carrier between the closed position of the carrier and the open position of the carrier; the bin may be configured to move relative to the carrier between the closed position of the bin and the rotated position of the bin. The component may comprise a mechanism; the mechanism may be configured (a) to allow movement of the bin between the closed position of the bin and the rotated position of the bin when the carrier is in the closed position and (b) to block movement of the bin relative to the carrier when the carrier is in the open position of the carrier. The component may comprise a blocking mechanism; the blocking mechanism may be configured to block movement of the carrier relative to the base when the bin moves toward the rotated position of the bin.

The present invention relates to a vehicle interior component comprising a base and a bin configured for movement relative to the base. The bin may be configured to provide a closed position and an open position relative to the base for access to the bin. The open position of the bin may comprise (a) a side access state and (b) an end access state. The bin may be configured for movement relative to the base to provide the end access state. The bin may be configured for pivotal movement relative to the base to provide the side access state. The bin may be configured for lateral movement relative to the base to provide the end access state. The end access state may comprise at least one of (a) a front access state and/or (b) a rear access state. The component may comprise a carrier for the bin; the carrier may be movable relative to the base. The carrier may be configured to extend relative to the base to provide the front access state for the bin; the carrier may be configured to retract relative to the base for the closed position. The base may comprise an end door assembly; the end door assembly may comprise a door configured to open for the bin in the end access state. The base may comprise a side door assembly; the bin may be configured to pivot with the side door assembly in the side access state. The side door assembly may comprise two side doors.

The present invention relates to a vehicle interior component comprising a base and a bin configured for a first state wherein the bin is secured to the base in a closed position and a second state wherein the bin is moveable relative to the base. The bin may be configured to move in a first direction relative to the base from the closed position to a first open position and in a second direction relative to the base from the closed position to a second open position. The bin may be configured to slide in the first direction and to rotate in the second direction. The bin may comprise a right bin and a left bin; the right bin may be configured to move in the second direction relative to the base; the left bin may be configured to move in a third direction relative to the base. The component may comprise a carrier movable between a closed position and an open position relative to the base. The carrier may be configured to slide relative to the base. The bin may be configured to move with the carrier in the first direction between the closed position of the carrier and the open position of the carrier. The bin may be configured to move relative to the carrier between the closed position of the bin and the second open position of the bin. The bin may comprise a storage compartment; the storage compartment may be configured for accessibility when the carrier is in the open position of the carrier; the base may be configured to cover the storage compartment when the bin is secured to the base. The component may comprise a set of tracks; the set of tracks may be configured to guide movement of the carrier between the closed position of the carrier and the open position of the carrier. The component may comprise a latch; the latch may be configured to block movement of the carrier between the closed position of the carrier and the open position of the carrier. The latch may be configured for actuation to enable movement of the carrier between the closed position of the carrier and the open position of the carrier. The component may comprise a mechanism; the mechanism may be configured to allow movement of the bin between the closed position of the bin and the second open position of the bin when the carrier is in the closed position and to block movement of the bin relative to the carrier when the carrier is in the open position of the carrier. The mechanism may comprise a latch mechanism. The mechanism may comprise a bar coupled to the carrier, a spring coupled to the carrier and at least one hook coupled to the bin. The bar may be configured to move relative to the carrier to block movement of the bin relative to the carrier when the carrier is in the open position of the carrier. The spring may be configured to bias the bar to allow movement of the bin between the closed position of the bin and the second open position of the bin when the carrier is in the closed position. The bin may comprise at least one hook; the at least one hook may be configured to couple the bin to the carrier as the carrier moves from the closed position of the carrier toward the open position of the carrier. The component may comprise a bar. The bar may be configured to engage the at least one hook to couple the bin to the carrier as the carrier moves from the closed position of the carrier toward the open position of the carrier. The bar may be configured to contact the base as the carrier moves toward the closed position of the carrier to disengage the bar and the at least one hook. The bar may be configured to engage the at least one hook to block movement of the bin relative to the carrier. The component may comprise a mechanism; the mechanism may be configured to block movement of the bin between the closed position of the bin and the second open position of the bin when the carrier moves from the closed position of the carrier toward the open position of the carrier. The mechanism may comprise a bolt mechanism. The mechanism may comprise a bar; the bar may be configured to move between a locked position to block movement of the bin toward the second open position of the bin and an unlocked position to enable movement of the bin between the closed position of the bin and the second open position of the bin. The component may comprise a door for the carrier movable between a closed position and an open position relative to the base. The door for the carrier may comprise a latch configured to latch the carrier to the base and unlatch the carrier from the base. The component may comprise a blocking mechanism; the blocking mechanism may be configured to block movement of the carrier relative to the base when the bin moves toward the second open position of the bin. The bin may comprise a projection; the projection of the bin may be configured to block movement of the carrier from the closed position of the carrier toward the open position of the carrier. The component may comprise a door for the bin movable relative to the base between a closed position and an open position; the door for the bin may comprise a latch configured to latch the door for the bin to the base and unlatch the door for the bin from the base. The door for the bin may comprise a surface; the surface of the door for the bin may be configured to move the bin toward the second open position of the bin. The bin may comprise an edge; the surface of the door for the bin may be configured to contact the edge of the bin to move the bin toward the second open position of the bin. The bin may comprise a projection; the projection of the bin may be configured to provide a stop of movement for the bin. The component may comprise at least one of a console; a floor console; a center console; a storage compartment. The base may comprise a front opening and a side opening; the bin may be configured to move from the closed position to the first open position through the front opening of the base, and the bin may be configured to move from the closed position to the second open position through the side opening of the base. The first open position may comprise a translated position, and the second open position may comprise a rotated position.

The present invention relates to a vehicle interior component comprising a base and a bin configured for a first state wherein the bin is secured to the base in a closed position and a second state wherein the bin is moveable relative to the base. The base may comprise a front opening and a side opening; the bin may be configured to move through the front opening of the base, and the bin may be configured to move through the side opening of the base. The bin may be configured to slide through the front opening of the base and to rotate through the side opening of the base. The side opening of the base may comprise a right side opening and a left side opening; the bin may be configured to move through the right side opening of the base and the left side opening of the base. The bin may comprise a right bin and a left bin; the right bin may be configured to move through the right side opening of the base and the left bin may be configured to move through the left side opening of the base. The component may comprise a carrier movable relative to the base between a closed position and an open position. The carrier may be configured to slide relative to the base through the front opening of the base. The bin may be configured to move with the carrier between the closed position of the carrier and the open position of the carrier. The bin may be configured to move relative to the carrier through the side opening of the base. The bin may comprise a storage compartment; the storage compartment may be configured for accessibility when the carrier is in the open position of the carrier, and the base may be configured to cover the storage compartment when the bin is in the closed position. The component may comprise a set of tracks; the set of tracks may be configured to guide movement of the carrier between the closed position of the carrier and the open position of the carrier. The component may comprise a latch; the latch may be configured to block movement of the carrier between the closed position of the carrier and the open position of the carrier. The latch may be configured for actuation to enable movement of the carrier between the closed position of the carrier and the open position of the carrier. The component may comprise a mechanism; the mechanism may be configured to allow movement of the bin through the side opening of the base when the carrier is in the closed position and to block movement of the bin relative to the carrier when the carrier is in the open position of the carrier. The mechanism may comprise a latch mechanism. The mechanism may comprise a bar coupled to the carrier, a spring coupled to the carrier and at least one hook coupled to the bin. The bar may be configured to move relative to the carrier to block movement of the bin relative to the carrier when the carrier is in the open position of the carrier. The spring may be configured to bias the bar to allow movement of the bin through the side opening of the base when the carrier is in the closed position. The bin may comprise at least one hook; the at least one hook may be configured to couple the bin to the carrier as the carrier moves from the closed position of the carrier toward the open position of the carrier. The component may comprise a bar. The bar may be configured to engage the at least one hook to couple the bin to the carrier as the carrier moves from the closed position of the carrier toward the open position of the carrier. The bar may be configured to contact the base as the carrier moves toward the closed position of the carrier to disengage the bar and the at least one hook. The bar may be configured to engage the at least one hook to block movement of the bin relative to the carrier. The component may comprise a mechanism; the mechanism may be configured to block movement of the bin through the side opening of the base when the carrier moves from the closed position of the carrier toward the open position of the carrier. The mechanism may comprise a bolt mechanism. The mechanism may comprise a bar; the bar may be configured to move between a locked position to block movement of the bin through the side opening of the base and an unlocked position to enable movement of the bin through the side opening of the base. The component may comprise a door for the carrier movable between a closed position and an open position relative to the base. The door for the carrier may comprise a latch configured to latch the carrier to the base and unlatch the carrier from the base. The component may comprise a mechanism; the mechanism may be configured to latch the door for the carrier to the base when the bin moves through the side opening of the base. The mechanism may comprise a blocking mechanism. The bin may comprise a projection; the projection of the bin may be configured to block movement of the carrier from the closed position of the carrier toward the open position of the carrier. The component may comprise a door for the bin movable relative to the base between a closed position and an open position; the door for the bin may comprise a latch configured to latch the door for the bin to the base and unlatch the door for the bin from the base. The door for the bin may comprise a surface; the surface of the door for the bin may be configured to move the bin through the side opening of the base. The bin may comprise an edge; the surface of the door for the bin may be configured to contact the edge of the bin to move the bin through the side opening of the base. The bin may comprise a projection; the projection of the bin may be configured to provide a stop of movement for the bin. The component may comprise at least one of a console; a floor console; a center console; a storage compartment.

The present invention relates to a vehicle interior component comprising a base and a bin configured for a first state wherein the bin is secured to the base in a closed position and a second state wherein the bin is moveable relative to the base. The bin may be configured to slide relative to the base between the closed position and a translated position and to rotate relative to the base between the closed position and a rotated position. The bin may comprise a right bin and a left bin; the right bin may be configured to move relative to the base between the closed position and the rotated position; the left bin may be configured to move relative to the base between the closed position and a second rotated position. The component may comprise a carrier movable between a closed position and an open position relative to the base. The carrier may be configured to slide relative to the base. The bin may be configured to move with the carrier between the closed position of the carrier and the open position of the carrier. The bin may be configured to move relative to the carrier between the closed position of the bin and the rotated position of the bin. The bin may comprise a storage compartment; the storage compartment may be configured for accessibility when the carrier is in the open position of the carrier, and the base may be configured to cover the storage compartment when the bin is secured to the base. The component may comprise a set of tracks; the set of tracks may be configured to guide movement of the carrier between the closed position of the carrier and the open position of the carrier. The component may comprise a latch; the latch may be configured to block movement of the carrier between the closed position of the carrier and the open position of the carrier. The latch may be configured for actuation to enable movement of the carrier between the closed position of the carrier and the open position of the carrier. The component may comprise a mechanism; the mechanism may be configured to allow movement of the bin between the closed position of the bin and the rotated position of the bin when the carrier is in the closed position and to block movement of the bin relative to the carrier when the carrier is in the open position of the carrier. The mechanism may comprise a latch mechanism. The mechanism may comprise a bar coupled to the carrier, a spring coupled to the carrier and at least one hook coupled to the bin. The bar may be configured to move relative to the carrier to block movement of the bin relative to the carrier when the carrier is in the open position of the carrier. The spring may be configured to bias the bar to allow movement of the bin between the closed position of the bin and the rotated position of the bin when the carrier is in the closed position. The bin may comprise at least one hook; the at least one hook may be configured to couple the bin to the carrier as the carrier moves from the closed position of the carrier toward the open position of the carrier. The component may comprise a bar. The bar may be configured to engage the at least one hook to couple the bin to the carrier as the carrier moves from the closed position of the carrier toward the open position of the carrier. The bar may be configured to contact the base as the carrier moves toward the closed position of the carrier to disengage the bar and the at least one hook. The bar may be configured to engage the at least one hook to block movement of the bin relative to the carrier. The component may comprise a mechanism; the mechanism may be configured to block movement of the bin between the closed position of the bin and the rotated position of the bin when the carrier moves from the closed position of the carrier toward the open position of the carrier. The mechanism may comprise a bolt mechanism. The mechanism may comprise a bar; the bar may be configured to move between a locked position to block movement of the bin toward the rotated position of the bin and an unlocked position to enable movement of the bin between the closed position of the bin and the rotated position of the bin. The component may comprise a door for the carrier movable between a closed position and an open position relative to the base. The door for the carrier may comprise a latch configured to latch the carrier to the base and unlatch the carrier from the base. The component may comprise a blocking mechanism; the blocking mechanism may be configured to block movement of the carrier relative to the base when the bin moves toward the rotated position of the bin. The bin may comprise a projection; the projection of the bin may be configured to block movement of the carrier from the closed position of the carrier toward the open position of the carrier. The component may comprise a door for the bin movable relative to the base between a closed position and an open position; the door for the bin may comprise a latch configured to latch the door for the bin to the base and unlatch the door for the bin from the base. The door for the bin may comprise a surface; the surface of the door for the bin may be configured to move the bin toward the rotated position of the bin. The bin may comprise an edge; the surface of the door for the bin may be configured to contact the edge of the bin to move the bin toward the rotated position of the bin. The bin may comprise a projection; the projection of the bin may be configured to provide a stop of movement for the bin. The component may comprise at least one of a console; a floor console; a center console; a storage compartment.

FIGURES

FIGS. 4A through 4D are schematic perspective views of a vehicle interior component shown as a console assembly according to an exemplary embodiment.

FIG. 5A is a schematic exploded perspective view of a vehicle interior component shown as a console assembly according to an exemplary embodiment.

FIG. 5B is a schematic exploded perspective view of a door assembly of a vehicle interior component shown as a console assembly according to an exemplary embodiment.

FIGS. 8A and 8B are schematic perspective views of a vehicle interior component shown as a console assembly according to an exemplary embodiment.

FIG. 8C is a schematic partial perspective view of a vehicle interior component shown as a console assembly according to an exemplary embodiment.

FIGS. 8D and 8E are schematic partial section views of a vehicle interior component shown as a console assembly according to an exemplary embodiment.

FIG. 10A is a schematic perspective view of a vehicle interior component shown as a console assembly according to an exemplary embodiment.

FIG. 10B is a schematic fragmentary perspective view of a vehicle interior component shown as a console assembly according to an exemplary embodiment.

FIG. 10C is a schematic perspective view of a vehicle interior component shown as a console assembly according to an exemplary embodiment.

FIG. 10D is a schematic fragmentary rear view of a vehicle interior component shown as a console assembly according to an exemplary embodiment.

FIG. 10E is a schematic perspective view of a vehicle interior component shown as a console assembly according to an exemplary embodiment.

DESCRIPTION

According to an exemplary embodiment as shown schematically in FIGS. 1A-1B and 2A-2D, a vehicle V may comprise an interior I with a vehicle interior component shown as a floor console C and a seat S. Floor console C may comprise a drawer or carrier D and a bin B.

Figure 1A:
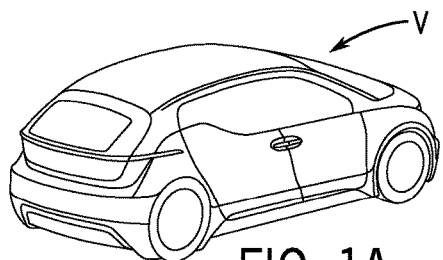
FIG. 1A is a schematic perspective view of a vehicle according to an exemplary embodiment.
Figure 1B:
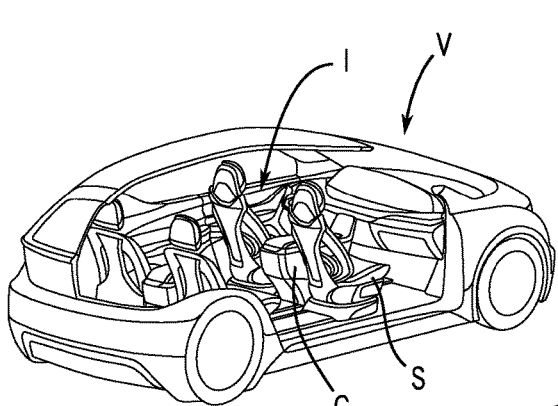
FIG. 1B is a schematic perspective view of a vehicle showing a vehicle interior according to an exemplary embodiment.
Figure 2B:
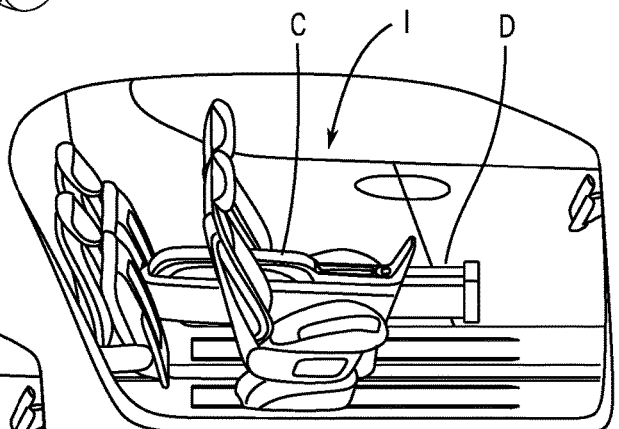
FIGS. 2A through 2D are schematic perspective views of a vehicle showing a vehicle interior according to an exemplary embodiment.
Figure 2A:
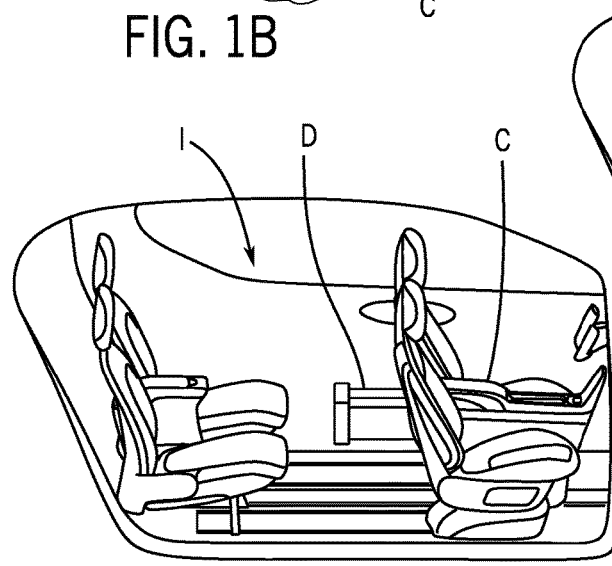

According to an exemplary embodiment as shown schematically in FIG. 2A, floor console or vehicle interior component C may comprise a drawer or carrier D shown in an open position. Drawer or carrier D may be movable between a closed position and an open position. Drawer or carrier D may comprise a bin. Floor console or vehicle interior component C may comprise a rear opening. Drawer or carrier D may be configured to move through the rear opening.

According to an exemplary embodiment as shown schematically in FIG. 2B, floor console or vehicle interior component C may comprise a drawer or carrier D shown in an open position. Drawer or carrier D may be movable between a closed position and an open position. Drawer or carrier D may comprise a bin. Floor console or vehicle interior component C may comprise a front opening. Drawer or carrier D may be configured to move or slide through the front opening.

Figure 2D:
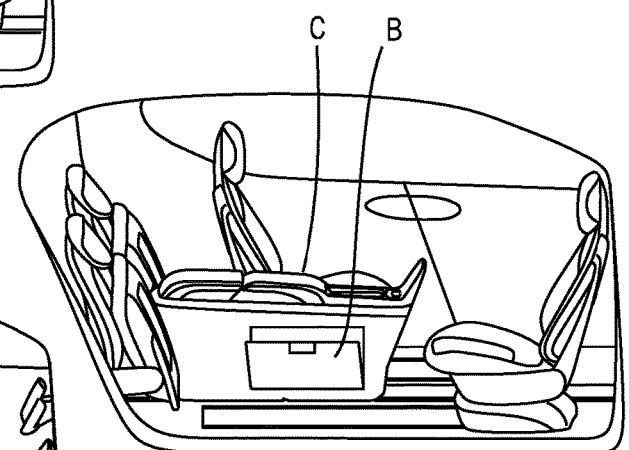
Figure 2C:
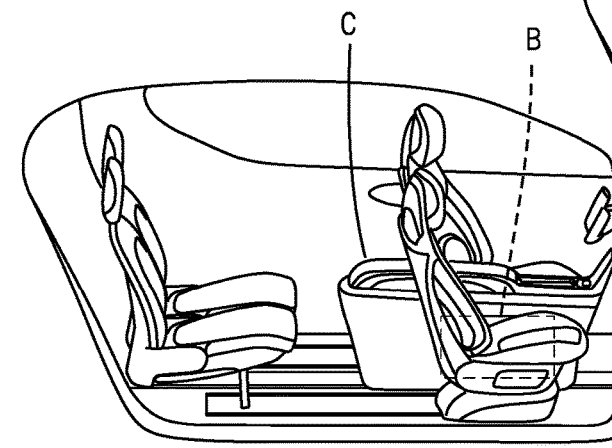

According to an exemplary embodiment as shown schematically in FIG. 2C, floor console or vehicle interior component C may comprise a bin B shown in a closed position.

According to an exemplary embodiment as shown schematically in FIG. 2D, floor console or vehicle interior component C may comprise a bin B shown in an open position. Bin B may be configured to move through at least one of a left side opening and a right side opening of floor console C. Bin B may be configured to rotate relative to floor console C through the left side opening and to rotate through the right side opening. Bin B may comprise a left bin configured to move through the left side opening and a right bin configured to move through the right side opening.

According to an exemplary embodiment as shown schematically in FIGS. 3A-3D, a vehicle interior component C/1000 (e.g. console, floor console, center console, storage compartment, etc.) may comprise a base 100 with a carrier 600, a door or right door 200, a door or left door, a bin/bin assembly 400/420 with a left bin 420b and a right bin 420a, and a door or front door 500 with a latch 530. As shown schematically in FIGS. 3B and 3C, a hand may actuate latch 530 and pull on door or front door 500 to move or slide carrier 600 and bin 400 relative to base 100 between a closed position and an open position through a front opening of base 100 and expose a storage compartment SC. As shown schematically in FIG. 3D, door or right door 200 may be unlatched from base 100 and moved or rotated relative to base 100 between a closed position and an open position through a right side opening of base 100 to rotate bin 400 and expose a right bin 420a and storage compartment SC. Door or left door may be unlatched from base 100 and moved or rotated relative to base 100 through a left side opening of base 100 to rotate bin 400 and expose a left bin 420b and storage compartment SC.

According to an exemplary embodiment as shown schematically in FIGS. 4A and 4B, a vehicle interior component C/2000 shown as a console (e.g. console, floor console, center console, storage compartment, etc.) may comprise a base 2100, a door or right door 200, a door or left door, a bin 400 comprising a left bin 420b and a right bin 420a, a right front door assembly 2510a and a left front door assembly 2510b with a latch 2530b. Latch 2530b may be actuated and left front door assembly 2510b may be moved to move left bin 420b relative to base 2100 through a front opening of base 2100 and expose a storage compartment SC as right bin 420a remains covered by base 2100. Right front door assembly 2510a may be moved to move right bin 420a relative to base 2100 through a front opening of base 2100 and expose a storage compartment SC as left bin 420b remains covered by base 2100. Right front door assembly 2510a and left front door assembly 2510b may be moved together to move right bin 420a and left bin 420b relative to base 2100 through a front opening of base 2100 and expose a storage compartment SC. Door or right door 200 may be unlatched from base 2100 and moved or rotated relative to base 2100 through a right side opening of base 2100 to rotate bin 400 and expose a right bin 420a and storage compartment SC. Door or left door may be unlatched from base 2100 and moved or rotated relative to base 2100 through a left side opening of base 2100 to rotate bin 400 and expose a left bin 420b and storage compartment SC.

According to an exemplary embodiment as shown schematically in FIG. 5A, a vehicle interior component C/1000 (e.g. console, floor console, center console, storage compartment, etc.) may comprise at least one of a base 100, a door or right door 200a, a door or left door 200b, a bin 400, a door or front door 500 and a cable 170. Base 100 may comprise at least one of a base substrate 110, a track assembly 140 and a track engagement mechanism 150. Base 100 may comprise at least one of a right side opening, a left side opening and a front opening. Track assembly 140 may comprise at least one of a right track 142 and a left track 144. Bin 400 may comprise a left bin 420b and a right bin 420a. Bin 400 may comprise a storage compartment SC. Bin 400 may comprise at least one hook 400h. Door or front door 500 may comprise at least one of a door structure 510, a spring 520 and a latch 530. Vehicle interior component C/1000 may comprise a carrier 600. Carrier 600 may comprise at least one of a bar 610, a spring 620. Vehicle interior component C/1000 may comprise a mechanism shown as latch mechanism 700. Mechanism 700 may comprise a bar 610, a spring 620 and at least one hook 400h. Vehicle interior component C/1000 may comprise a mechanism shown as bolt mechanism 800. Mechanism 800 may comprise at least one of a spring 122, a plunger 124, a bar 240. Vehicle interior component C/1000 may comprise a mechanism shown as blocking mechanism 900. Mechanism 900 may comprise a projection 420p and a latch 530.

According to an exemplary embodiment as shown schematically in FIG. 5B, door or right door 200 may comprise at least one of a side door outer 210, a spring 220, a latch 230, a bar 240, a pivot rod 250, a spring 260 and a side door inner 270. Door or left door may comprise a side door outer 310, spring 220, a latch 330, bar 240, pivot rod 250, spring 260 and a side door inner 370.

According to an exemplary embodiment as shown schematically in FIGS. 3A-3D, 4A-4D, 5A-5B, 6, 7A-7F, 8A-8E, 9A-9D, 10A-10E, 11A-11E, 12A-12F, 13A-13C and 14A-14D, a vehicle interior component C/1000/2000 may comprise a base 100/2100 and a bin 400 configured for a first state wherein bin 400 is secured to base 100/2100 in a closed position as shown schematically in FIGS. 2A, 4A, 11A, 12A, 14A and 14C and a second state wherein bin 400 is moveable relative to base 100/2100 as shown schematically in FIGS. 3B-3D, 4B, 8A-8E, 9A-9E, 10A-10E, 11B-11E, 12B-12F, 13B, 13C, 14B and 14D. Bin 400 may be configured to move in a first direction relative to base 100/2100 from the closed position to a first open position as shown schematically in FIG. 3C and in a second direction relative to base 100/2100 from the closed position to a second open position as shown schematically in FIG. 3D. Bin 400 may be configured to slide in the first direction and to rotate in the second direction. Bin 400 may comprise a right bin 420a and a left bin 420b; right bin 420a may be configured to move in the second direction relative to base 100/2100; left bin 420b may be configured to move in a third direction relative to base 100/2100. Component C/1000/2000 may comprise a carrier 600/2600a/b movable between a closed position as shown schematically in FIGS. 2A, 3D, 4A, 7A, 10A, 10C, 10E, 11A-11E, 12A-12F, 13A-13C and 14A-14D and an open position as shown schematically in FIG. 3C relative to base 100/2100. Carrier 600/2600a/b may be configured to slide relative to base 100/2100. Bin 400 may be configured to move with carrier 600/2600a/b in the first direction between the closed position of carrier and the open position of carrier as shown schematically in FIGS. 3B and 3C. Bin 400 may be configured to move relative to carrier 600/2600a/b between the closed position of bin 400 and the second open position of bin 400. Bin 400 may comprise a storage compartment SC; storage compartment SC may be configured for accessibility when carrier 600/2600a/b is in the open position of carrier; base 100/2100 may be configured to cover storage compartment SC when bin 400 is secured to base 100/2100. Component C/1000/2000 may comprise a set of tracks 140/2140; set of tracks 140/2140 may be configured to guide movement of carrier 600/2600a/b between the closed position of carrier and the open position of carrier. Component C/1000/2000 may comprise a latch 150; latch 150 may be configured to block movement of carrier 600/2600a/b between the closed position of carrier and the open position of carrier. Latch 150 may be configured for actuation to enable movement of carrier 600/2600a/b between the closed position of carrier and the open position of carrier. Component C/1000/2000 may comprise a mechanism 700; mechanism 700 may be configured to allow movement of bin 400 between the closed position of bin 400 and the second open position of bin 400 when carrier 600/2600a/b is in the closed position as shown schematically in FIGS. 9C and 12A-12C and to block movement of bin 400 relative to carrier 600/2600a/b when carrier 600/2600a/b is in the open position of carrier as shown schematically in FIGS. 9D and 9E.

Mechanism 700 may comprise a latch mechanism. Mechanism 700 may comprise a bar 610 or 2610a/b (comprising bar 2610a/2610b) coupled to carrier 600/2600, a spring 620 coupled to carrier 600/2600a/b and at least one hook 400h coupled to bin 400. Bar 610/2610a/b may be configured to move relative to carrier 600/2600a/b to block movement of bin 400 relative to carrier 600/2600a/b when carrier 600/2600a/b is in the open position of carrier as shown schematically in FIGS. 9A-9E. Spring 620 may be configured to bias bar 610/2610a/b to allow movement of bin 400 between the closed position of bin 400 and the second open position of bin 400 when carrier 600/2600a/b is in the closed position. Bin 400 may comprise at least one hook 400h; the at least one hook 400h may be configured to couple bin 400 to carrier 600/2600a/b as carrier 600/2600a/b moves from the closed position of carrier toward the open position of carrier. Component C/1000/2000 may comprise a bar 610/2610. Bar 610/2610 may be configured to engage the at least one hook 400h to couple bin 400 to carrier 600/2600a/b as carrier 600/2600a/b moves from the closed position of carrier toward the open position of carrier. Bar 610/2610a/b may be configured to contact base 100/2100 as carrier 600/2600a/b moves toward the closed position of carrier to disengage bar 610/2610a/b and the at least one hook 400h. Bar 610/2610a/b may be configured to engage the at least one hook 400h to block movement of bin 400 relative to carrier 600/2600.

Component C/1000/2000 may comprise a mechanism 800; mechanism 800 may be configured to block movement of bin 400 between the closed position of bin 400 and the second open position of bin 400 when carrier 600/2600a/b moves from the closed position of carrier toward the open position of carrier as shown schematically in FIGS. 5A-5E. Mechanism 800 may comprise a bolt mechanism. Mechanism 800 may comprise a bar or bolt 240; bar 240 may be configured to move between a locked position as shown schematically in FIGS. 8B, 8C and 8E to block movement of bin 400 toward the second open position of bin 400 and an unlocked position as shown schematically in FIGS. 8A and 8D to enable movement of bin 400 between the closed position of bin 400 and the second open position of bin 400. Component C/1000/2000 may comprise a door 500 for carrier 600/2600a/b movable between a closed position and an open position relative to base 100/2100. Door 500 for carrier 600/2600a/b may comprise a latch 530 configured to latch carrier 600/2600a/b to base 100/2100 and unlatch carrier 600/2600a/b from base 100/2100.

Component C/1000/2000 may comprise a blocking mechanism 900; blocking mechanism 900 may be configured to block movement of carrier relative to base 100/2100 when bin 400 moves toward the second open position of bin 400 position as shown schematically in FIGS. 13B, 13C, 14B and 14D. Bin 400 may comprise a projection 420p; projection 420p of bin 400 may be configured to block movement of carrier 600/2600a/b from the closed position of carrier toward the open position of carrier. Component C/1000/2000 may comprise a door 200a/200b for bin 400 movable relative to base 100/2100 between a closed position and an open position; door 200a/200b for bin 400 may comprise a latch 230 configured to latch door 200a/200b for bin 400 to base 100/2100 and unlatch door 200a/200b for bin 400 from base 100/2100. Door 200a/200b for bin 400 may comprise a surface 200s; surface 200s of door 200a/200b for bin 400 may be configured to move bin 400 toward the second open position of bin 400 as shown schematically in FIGS. 12A-12C and 14A-14B. Bin 400 may comprise an edge 420e; surface of door 200a/200b for bin 400 may be configured to contact edge 420e of bin 400 to move bin 400 toward the second open position of bin 400. Bin 400 may comprise a projection 420p; projection 420p of bin 400 may be configured to provide a stop of movement for bin 400 as shown schematically in FIGS. 13C, 14B and 14D.

Component C/1000/2000 may comprise at least one of a console; a floor console; a center console; a storage compartment. Base 100/2100 may comprise a front opening and a side opening; bin 400 may be configured to move from the closed position to the first open position through front opening of base 100/2100, and bin 400 may be configured to move from the closed position to the second open position through side opening of base 100/2100. The first open position may comprise a translated position, and the second open position may comprise a rotated position.

According to an exemplary embodiment as shown schematically in FIGS. 3A-3D, 4A-4D, 5A-5B, 4A-4F, 6, 8A-8E, 9A-9D, 10A-10E, 11A-11E, 12A-12F, 13A-13C and 14A-14D, a vehicle interior component C/1000/2000 may comprise a base 100/2100 and a bin 400 configured for a first state wherein bin 400 is secured to base 100/2100 in a closed position as shown schematically in FIGS. 2A, 4A, 11A, 12A, 14A and 14C and a second state wherein bin 400 is moveable relative to base 100/2100 as shown schematically in FIGS. 3B-3D, 4B, 8A-8E, 9A-9E, 10A-10E, 11B-11E, 12B-12F, 13B, 13C, 14B and 14D. Base 100/2100 may comprise a front opening and a side opening; bin 400 may be configured to move through front opening of base 100/2100 as shown schematically in FIG. 3C, and bin 400 may be configured to move through side opening of base 100/2100 as shown schematically in FIG. 3D. Bin 400 may be configured to slide through front opening of base 100/2100 and to rotate through side opening of base 100/2100. Side opening of base 100/2100 may comprise a right side opening and a left side opening; bin 400 may be configured to move through right side opening of base 100/2100 and left side opening of base 100/2100. Bin 400 may comprise a right bin 420a and a left bin 420b; right bin 420a may be configured to move through right side opening of base 100/2100 and left bin 420b may be configured to move through left side opening of base 100/2100.

Figure 3A:
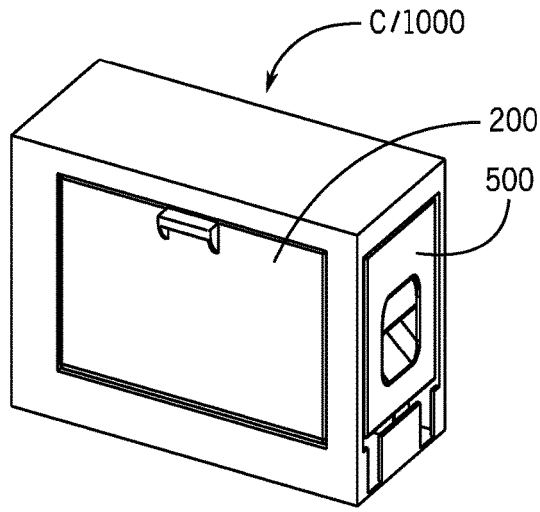
FIGS. 3A through 3D are schematic perspective views of a vehicle interior component shown as a console assembly according to an exemplary embodiment.
Figure 3B:
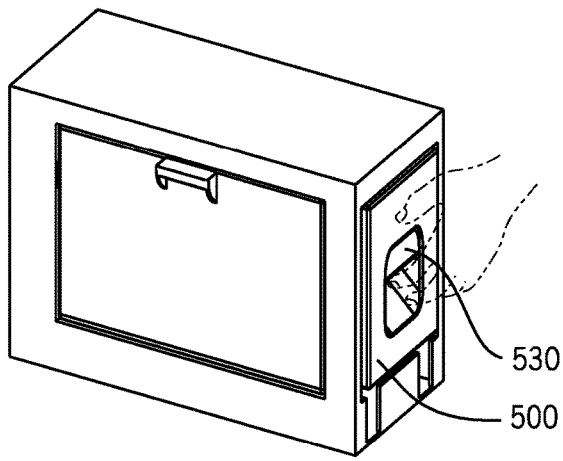
Figure 3C:
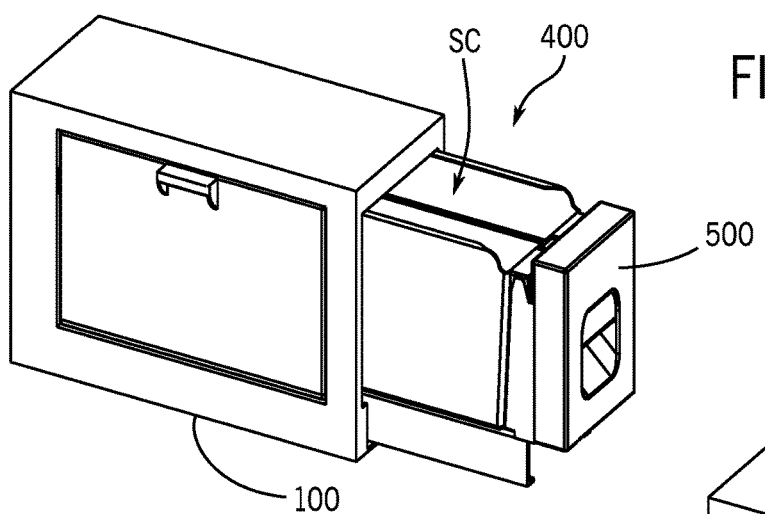
Figure 3D:
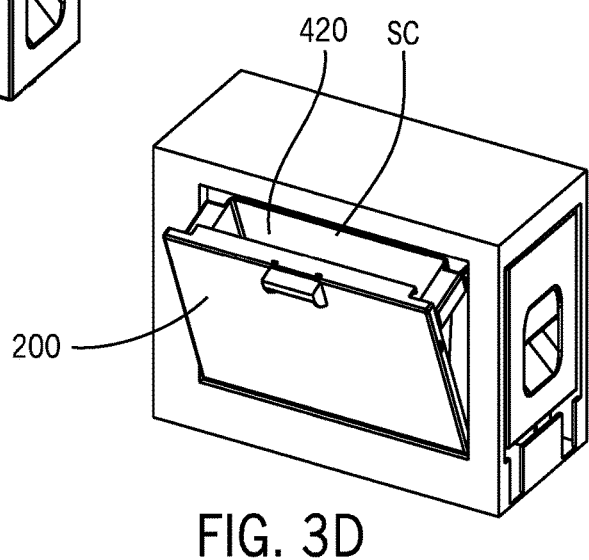

Component C/1000/2000 may comprise a carrier movable relative to base 100/2100 between a closed position as shown schematically in FIGS. 2A, 3D, 4A, 4A, 10A, 10C, 10E, 11A-11E, 12A-12F, 13A-13C and 14A-14D and an open position as shown schematically in FIG. 3C. Carrier 600/2600*a/b* may be configured to slide relative to base 100/2100 through front opening of base 100/2100. Bin 400 may be configured to move with carrier between the closed position of carrier and the open position of carrier as shown schematically in FIGS. 3B and 3C. Bin 400 may be configured to move relative to carrier through side opening of base 100/2100. Bin 400 may comprise a storage compartment SC; storage compartment SC may be configured for accessibility when carrier is in the open position of carrier, and base 100/2100 may be configured to cover storage compartment SC when bin 400 is in the closed position. Component C/1000/2000 may comprise a set of tracks 140/2140; set of tracks 140/2140 may be configured to guide movement of carrier between the closed position of carrier and the open position of carrier. Component C/1000/2000 may comprise a latch 150; latch 150 may be configured to block movement of carrier 600/2600*a/b* between the closed position of carrier and the open position of carrier. Latch 150 may be configured for actuation to enable movement of carrier 600/2600*a/b* between the closed position of carrier and the open position of carrier.

Figure 9A:
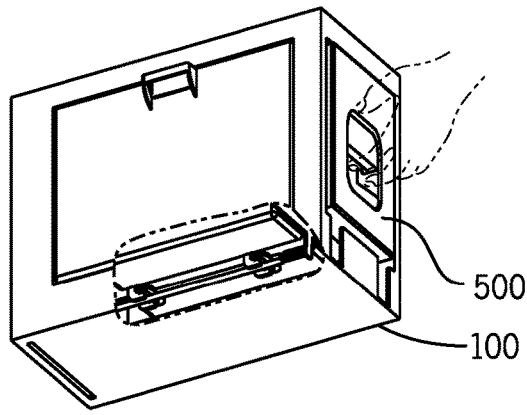
FIGS. 9A and 9B are schematic perspective views of a vehicle interior component shown as a console assembly according to an exemplary embodiment.
Figure 9B:
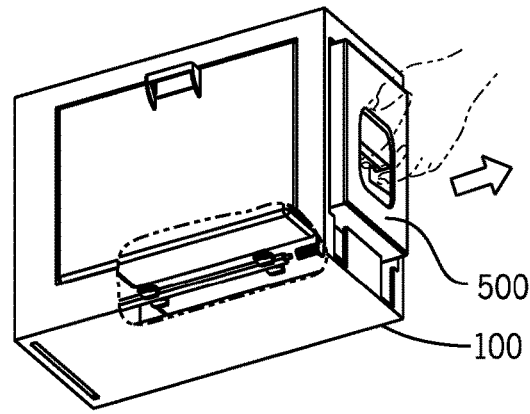
Figure 9C:
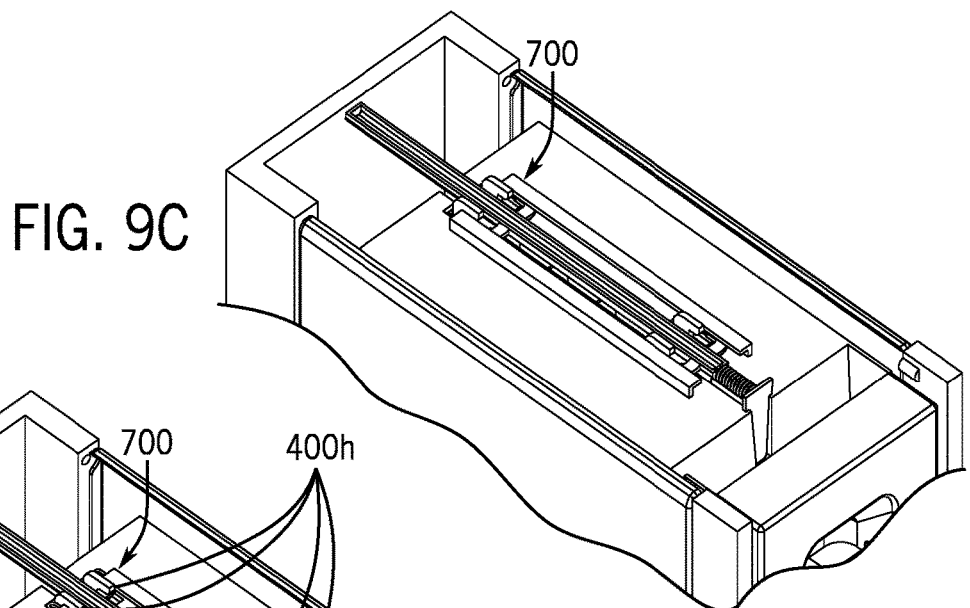
FIGS. 9C and 9D are schematic partial perspective views of a vehicle interior component shown as a console assembly according to an exemplary embodiment.
Figure 9D:
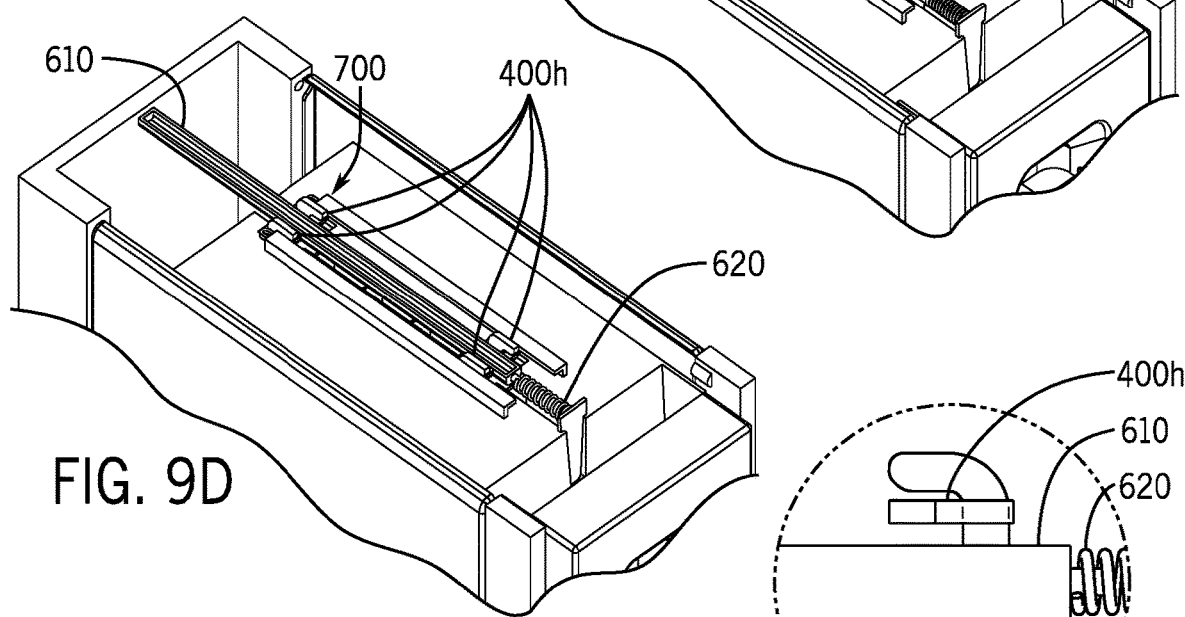
Figure 9E:
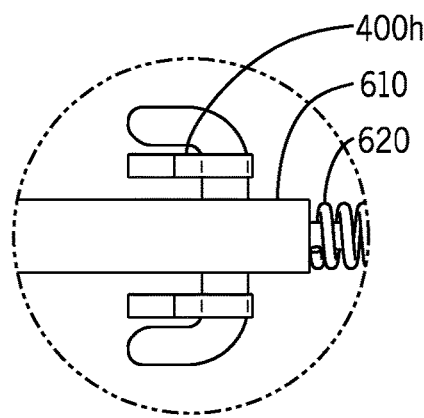
FIG. 9E is a schematic partial section view of a vehicle interior component shown as a console assembly according to an exemplary embodiment
Figure 11A:
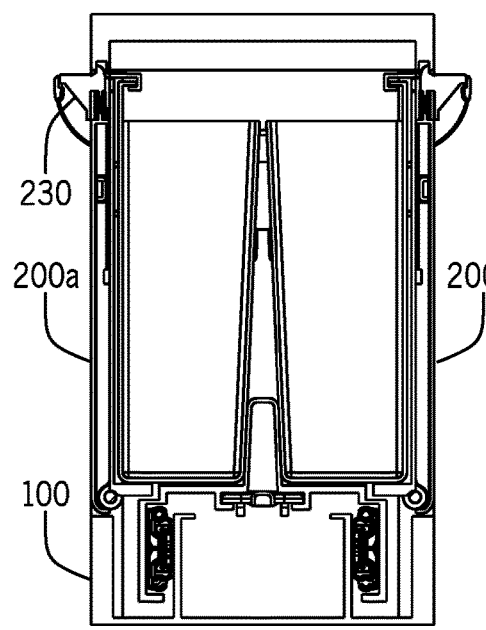
FIG. 11A is a schematic section view of a vehicle interior component shown as a console assembly according to an exemplary embodiment.
Figure 11B:
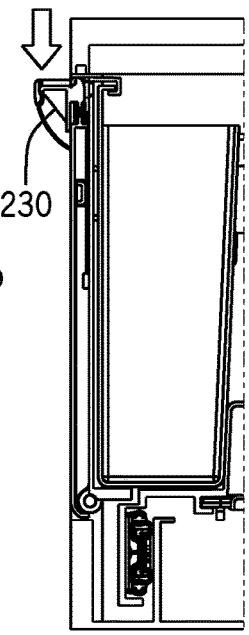
FIGS. 11B and 11C are schematic partial section views of a vehicle interior component shown as a console assembly according to an exemplary embodiment.
Figure 11C:
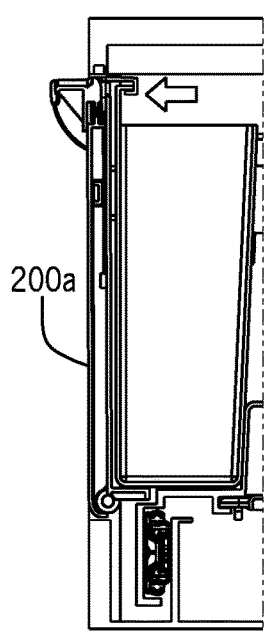
Figure 11D:
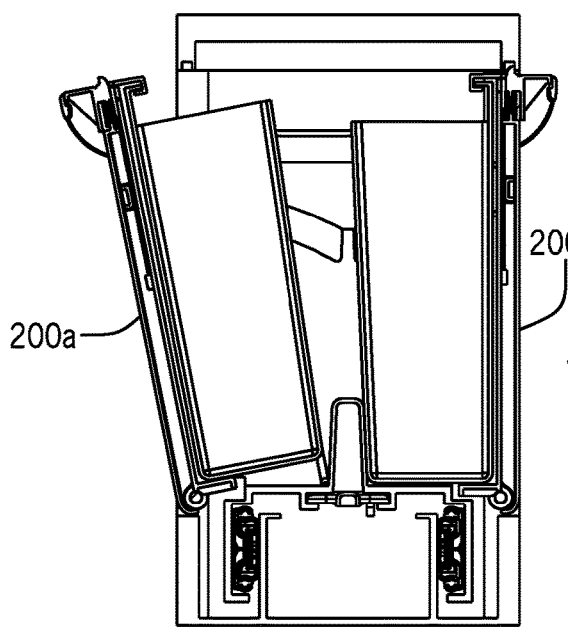
FIGS. 11D and 11E are schematic section views of a vehicle interior component shown as a console assembly according to an exemplary embodiment.
Figure 11E:
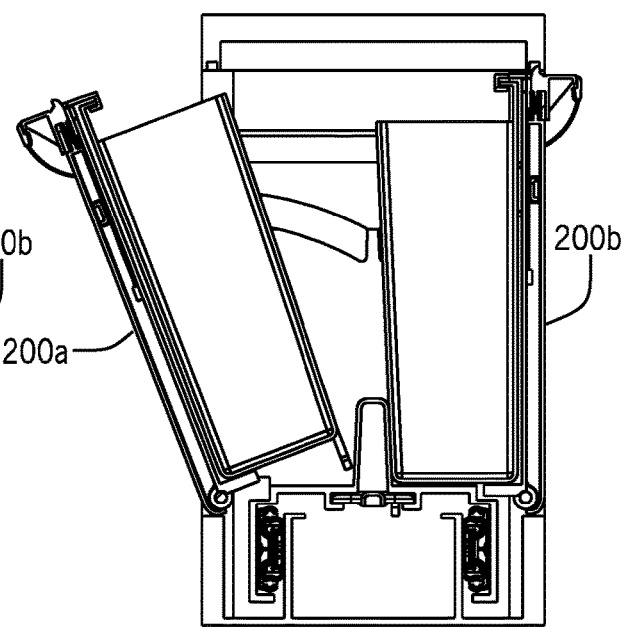
Figure 12A:
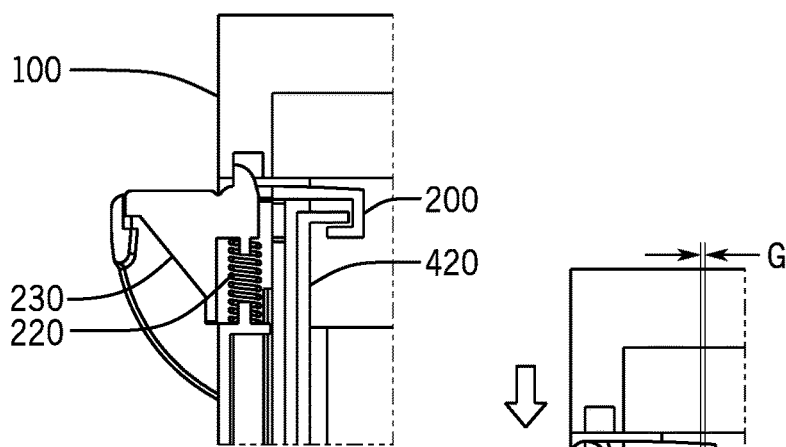
FIGS. 12A through 12F are schematic partial section views of a vehicle interior component shown as a console assembly according to an exemplary embodiment.
Figure 12B:
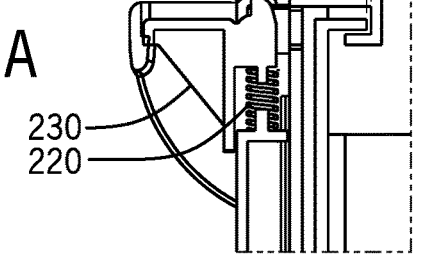
Figure 12C:
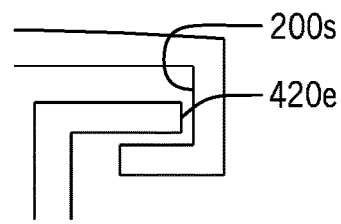
Figure 12D:
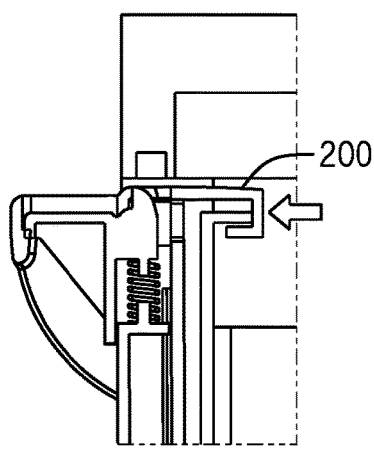
Figure 12E:
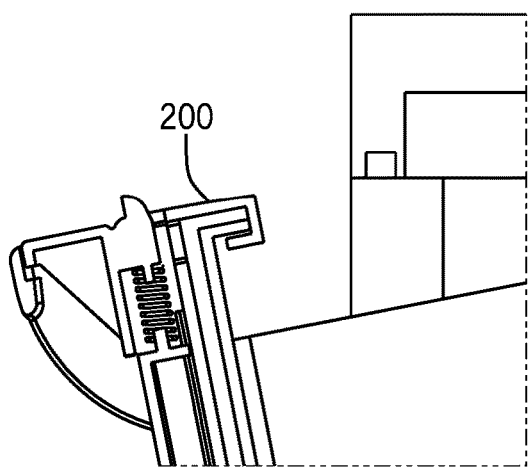
Figure 12F:
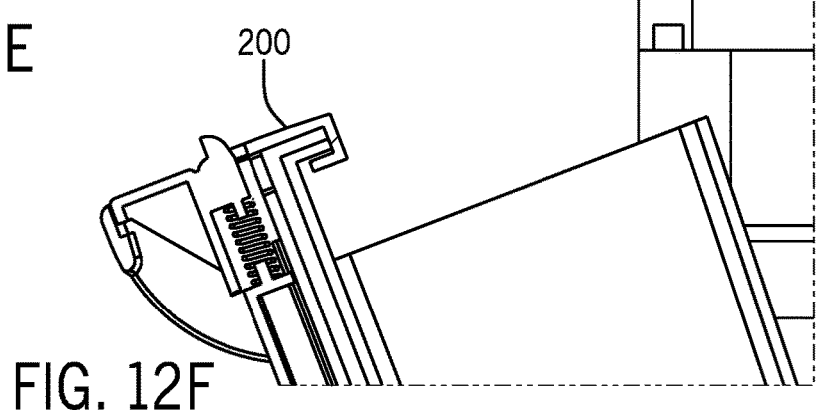
Figure 13A:
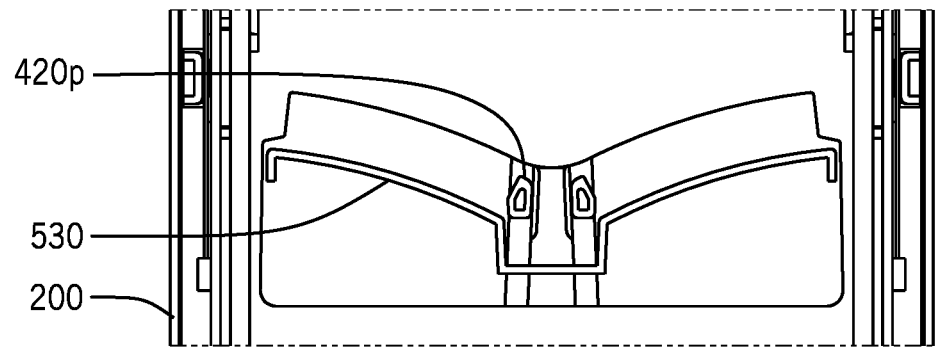
FIGS. 13A through 13C are schematic partial section views of a vehicle interior component shown as a console assembly according to an exemplary embodiment.
Figure 13B:
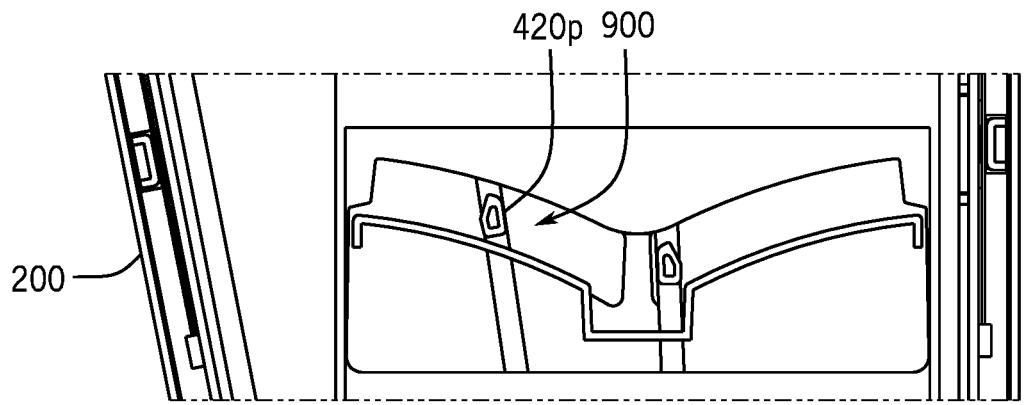
Figure 13C:
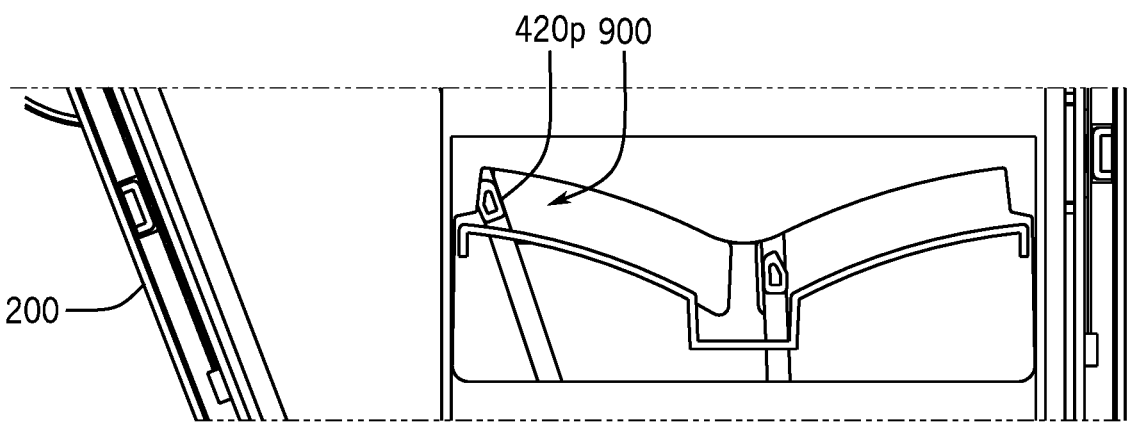
Figure 14A:
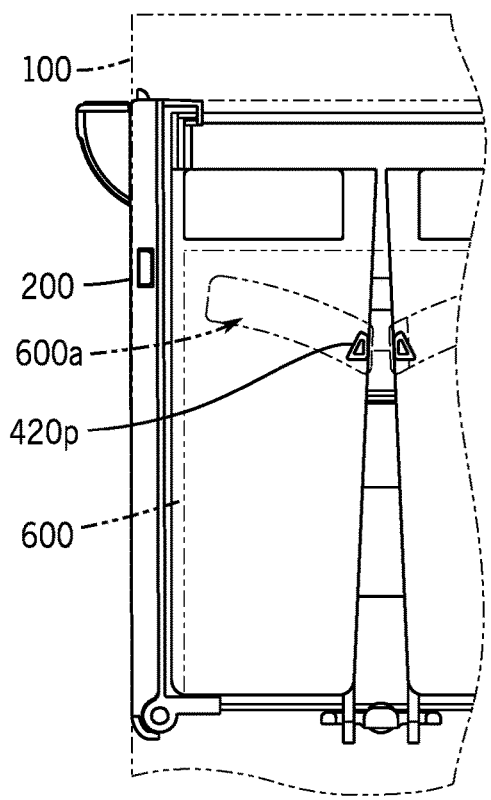
FIGS. 14A and 14B are schematic partial rear views of a vehicle interior component shown as a console assembly according to an exemplary embodiment.
Figure 14B:
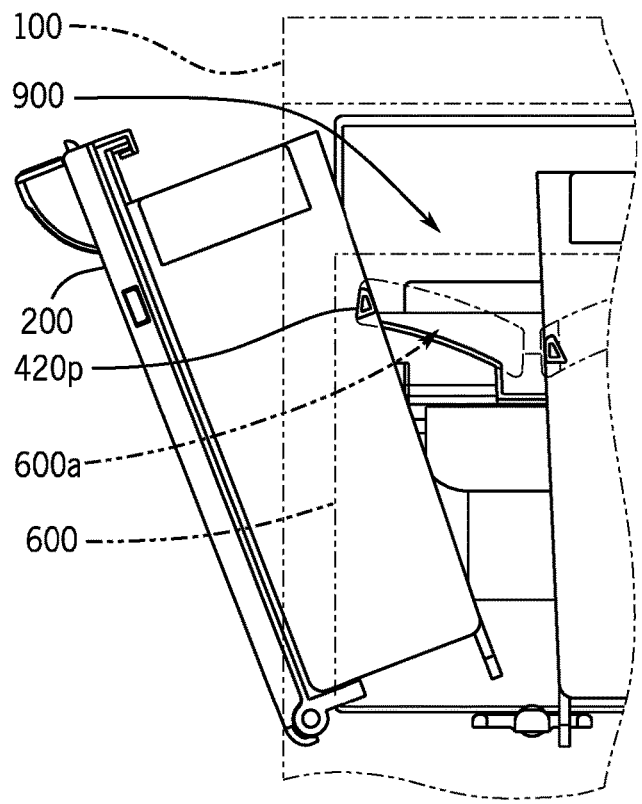
Figure 14C:
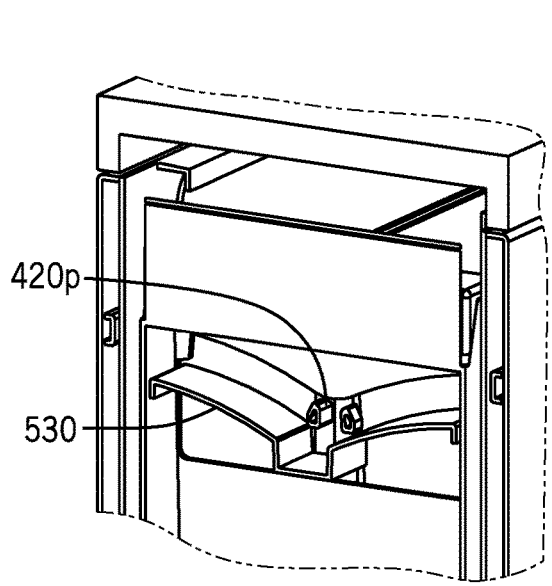
FIGS. 14C and 14D are schematic partial perspective views of a vehicle interior component shown as a console assembly according to an exemplary embodiment.
Figure 14D:
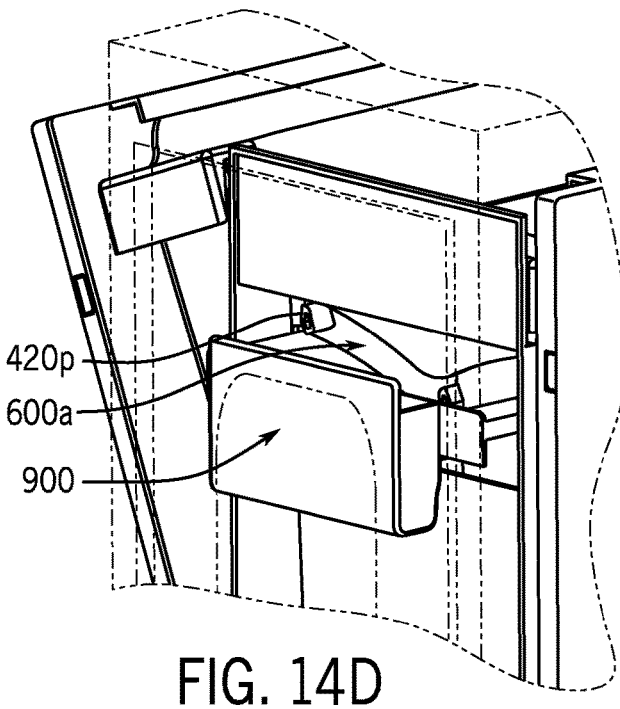

Component C/1000/2000 may comprise a mechanism 700; mechanism 700 may be configured to allow movement of bin 400 through side opening of base 100/2100 when carrier 600/2600*a/b* is in the closed position as shown schematically in FIGS. 9C and 12A-12C and to block movement of bin 400 relative to carrier 600/2600*a/b* when carrier 600/2600*a/b* is in the open position of carrier as shown schematically in FIGS. 9D and 9E. Mechanism 700 may comprise a latch mechanism. Mechanism 700 may comprise a bar 610/2610*a/b* coupled to carrier 600/2600, a spring 620 coupled to carrier 600/2600*a/b* and at least one hook 400*h* coupled to bin 400. Bar 610/2610*a/b* may be configured to move relative to carrier 600/2600*a/b* to block movement of bin 400 relative to carrier 600/2600*a/b* when carrier 600/2600*a/b* is in the open position of carrier as shown schematically in FIGS. 9A-9E. Spring 620 may be configured to bias bar 610/2610*a/b* to allow movement of bin 400 through side opening of base 100/2100 when carrier 600/2600*a/b* is in the closed position. Bin 400 may comprise at least one hook 400*h*; the at least one hook 400*h* may be configured to couple bin 400 to carrier 600/2600*a/b* as carrier 600/2600*a/b* moves from the closed position of carrier toward the open position of carrier.

Component C/1000/2000 may comprise a bar 610/2610. Bar 610/2610*a/b* may be configured to engage the at least one hook 400*h* to couple bin 400 to carrier 600/2600*a/b* as carrier 600/2600*a/b* moves from the closed position of carrier toward the open position of carrier. Bar 610/2610*a/b* may be configured to contact base 100/2100 as carrier 600/2600*a/b* moves toward the closed position of carrier to disengage bar 610/2610*a/b* and the at least one hook 400*h*. Bar 610/2610*a/b* may be configured to engage the at least one hook 400*h* to block movement of bin 400 relative to carrier 600/2600. Component C/1000/2000 may comprise a mechanism 800; mechanism 800 may be configured to block movement of bin 400 through side opening of base 100/2100 when carrier 600/2600*a/b* moves from the closed position of carrier toward the open position of carrier as shown schematically in FIGS. 8A-8E. Mechanism 800 may comprise a bolt mechanism. Mechanism 800 may comprise a bar or bolt 240; bar 240 may be configured to move between a locked position as shown schematically in FIGS. 8B, 8C and 8E to block movement of bin 400 through side opening of base 100/2100 and an unlocked position as shown schematically in FIGS. 8A and 8D to enable movement of bin 400 through side opening of base 100/2100. Component C/1000/2000 may comprise a door 500 for carrier 600/2600*a/b* movable between a closed position and an open position relative to base 100/2100. Door 500 for carrier 600/2600*a/b* may comprise a latch 530 configured to latch carrier 600/2600*a/b* to base 100/2100 and unlatch carrier 600/2600*a/b* from base 100/2100.

Component C/1000/2000 may comprise a mechanism 900; mechanism 900 may be configured to latch door 500 for carrier 600/2600*a/b* to base 100/2100 when bin 400 moves through side opening of base 100/2100 as shown schematically in FIGS. 13B, 13C, 14B and 14D. Mechanism 900 may comprise a blocking mechanism. Bin 400 may comprise a projection 420*p*; projection 420*p* of bin 400 may be configured to block movement of carrier 600/2600*a/b* from the closed position of carrier toward the open position of carrier. Component C/1000/2000 may comprise a door 200*a*/200*b* for bin 400 movable relative to base 100/2100 between a closed position and an open position; door 200*a*/200*b* for bin 400 may comprise a latch 230 configured to latch door 200*a*/200*b* for bin 400 to base 100/2100 and unlatch door 200*a*/200*b* for bin 400 from base 100/2100. Door 200*a*/200*b* for bin 400 may comprise a surface 200*s*; surface 200*s* of door 200*a*/200*b* for bin 400 may be configured to move bin 400 through side opening of base 100/2100 as shown schematically in FIGS. 12A-12C and 14A-14B. Bin 400 may comprise an edge 420*e*; surface 200*s* of door 200 for bin 400 may be configured to contact edge 420*e* of bin 400 to move bin 400 through side opening of base 100/2100. Bin 400 may comprise a projection 420*p*; projection 420*p* of bin 400 may be configured to provide a stop of movement for bin 400 as shown schematically in FIGS. 10C, 14B and 14D.

Component C/1000/2000 may comprise at least one of a console; a floor console; a center console; a storage compartment.

According to an exemplary embodiment as shown schematically in FIGS. 3A-3D, 4A-4D, 5A-5B, 4A-4F, 6, 8A-8E, 9A-9D, 10A-10E, 11A-11E, 12A-12F, 13A-13C and 14A-14D, a vehicle interior component C/1000/2000 may comprise a base 100/2100 and a bin 400 configured for a first state wherein bin 400 is secured to base 100/2100 in a closed position as shown schematically in FIGS. 2A, 4A, 11A, 12A, 14A and 14C and a second state wherein bin 400 is moveable relative to base 100/2100 as shown schematically in FIGS. 3B-3D, 4B, 8A-8E, 9A-9E, 10A-10E, 11B-11E, 12B-12F, 13B, 13C, 14B and 14D. Bin 400 may be configured to slide relative to base 100/2100 between the closed position and a translated position as shown schematically in FIG. 3C and to rotate relative to base 100/2100 between the closed position and a rotated position as shown schematically in FIG. 3D. Bin 400/420 may comprise a right bin 420*a* and a left bin 420*b*; right bin 420*a* may be configured to move relative to base 100/2100 between the closed position and the rotated position; left bin 420*b* may be configured to move relative to base 100/2100 between the closed position and a second rotated position.

Component C/1000/2000 may comprise a carrier 600/2600*a/b* movable between a closed position as shown schematically in FIGS. 2A, 3D, 4A, 4A, 10A, 10C, 10E, 11A-11E, 12A-12F, 13A-13C and 14A-14D and an open position as shown schematically in FIG. 3C relative to base 100/2100. Carrier 600/2600*a/b* may be configured to slide relative to base 100/2100. Bin 400 may be configured to move with carrier 600/2600*a/b* between the closed position of carrier and the open position of carrier. Bin 400 may be configured to move relative to carrier 600/2600*a/b* between the closed position of bin 400 and the rotated position of bin 400. Bin 400 may comprise a storage compartment SC; storage compartment SC may be configured for accessibility when carrier 600/2600*a/b* is in the open position of carrier, and base 100/2100 may be configured to cover storage compartment SC when bin 400 is secured to base 100/2100. Component C/1000/2000 may comprise a set of tracks 140/2140; set of tracks 140/2140 may be configured to guide movement of carrier 600/2600*a/b* between the closed position of carrier and the open position of carrier. Component C/1000/2000 may comprise a latch 150; latch 150 may be configured to block movement of carrier 600/2600*a/b* between the closed position of carrier and the open position of carrier. Latch 150 may be configured for actuation to enable movement of carrier 600/2600*a/b* between the closed position of carrier and the open position of carrier.

Component C/1000/2000 may comprise a mechanism 700; mechanism 700 may be configured to allow movement of bin 400 between the closed position of bin 400 and the rotated position of bin 400 when carrier 600/2600*a/b* is in the closed position as shown schematically in FIGS. 9C and 12A-12C and to block movement of bin 400 relative to carrier 600/2600*a/b* when carrier 600/2600*a/b* is in the open position of carrier as shown schematically in FIGS. 9D and 9E. Mechanism 700 may comprise a latch mechanism. Mechanism 700 may comprise a bar 610/2610*a/b* coupled to carrier 600/2600, a spring 620 coupled to carrier 600/2600*a/b* and at least one hook 400*h* coupled to bin 400. Bar 610/2610*a/b* may be configured to move relative to carrier 600/2600*a/b* to block movement of bin 400 relative to carrier 600/2600*a/b* when carrier 600/2600*a/b* is in the open position of carrier as shown schematically in FIGS. 9A-9E. Spring 620 may be configured to bias bar 610/2610*a/b* to allow movement of bin 400 between the closed position of bin 400 and the rotated position of bin 400 when carrier 600/2600*a/b* is in the closed position. Bin 400 may comprise at least one hook 400*h*; the at least one hook 400*h* may be configured to couple bin 400 to carrier 600/2600*a/b* as carrier 600/2600*a/b* moves from the closed position of carrier toward the open position of carrier. Component C/1000/2000 may comprise a bar 610/2610. Bar 610/2610*a/b* may be configured to engage the at least one hook 400*h* to couple bin 400 to carrier 600/2600*a/b* as carrier 600/2600*a/b* moves from the closed position of carrier toward the open position of carrier. Bar 610/2610*a/b* may be configured to contact base 100/2100 as carrier 600/2600*a/b* moves toward the closed position of carrier to disengage bar 610/2610*a/b* and the at least one hook 400*h*. Bar 610/2610*a/b* may be configured to engage the at least one hook 400*h* to block movement of bin 400 relative to carrier 600/2600.

Component C/1000/2000 may comprise a mechanism 800; mechanism 800 may be configured to block movement of bin 400 between the closed position of bin 400 and the rotated position of bin 400 when carrier 600/2600*a/b* moves from the closed position of carrier toward the open position of carrier as shown schematically in FIGS. 8A-8E. Mechanism 800 may comprise a bolt mechanism. Mechanism 800 may comprise a bar or bolt 240; bar 240 may be configured to move between a locked position as shown schematically in FIGS. 8B, 8C and 8E to block movement of bin 400 toward the rotated position of bin 400 and an unlocked position as shown schematically in FIGS. 8A and 8D to enable movement of bin 400 between the closed position of bin 400 and the rotated position of bin 400. Component C/1000/2000 may comprise a door 500 for carrier 600/2600*a/b* movable between a closed position and an open position relative to base 100/2100. Door 500 for carrier 600/2600*a/b* may comprise a latch 150 configured to latch carrier 600/2600*a/b* to base 100/2100 and unlatch carrier 600/2600*a/b* from base 100/2100. Component C/1000/2000 may comprise a blocking mechanism 900; blocking mechanism 900 may be configured to block movement of carrier relative to base 100/2100 when bin 400 moves toward the rotated position of bin 400 as shown schematically in FIGS. 13B, 13C, 14B and 14D. Bin 400 may comprise a projection 420*p*; projection 420*p* of bin 400 may be configured to block movement of carrier 600/2600*a/b* from the closed position of carrier toward the open position of carrier. Component C/1000/2000 may comprise a door 200 for bin 400 movable relative to base 100/2100 between a closed position and an open position; door 200 for bin 400 may comprise a latch 230 configured to latch door 200 for bin 400 to base 100/2100 and unlatch door 200 for bin 400 from base 100/2100. Door 200 for bin 400 may comprise a surface 200*s*; surface 200*s* of door 200 for bin 400 may be configured to move bin 400 toward the rotated position of bin 400 as shown schematically in FIGS. 12A-12C and 14A-14B. Bin 400 may comprise an edge 420*e*; surface 200*s* of door 200 for bin 400 may be configured to contact edge 420*e* of bin 400 to move bin 400 toward the rotated position of bin 400. Bin 400 may comprise a projection 420*p*; projection 420*p* of bin 400 may be configured to provide a stop of movement for bin 400 as shown schematically in FIGS. 13C, 14B and 14D. Component C/1000/2000 may comprise at least one of a console; a floor console; a center console; a storage compartment.

According to an exemplary embodiment as shown schematically in FIG. 5A, carrier 600 may be configured to move between a closed position and an open position relative to base 100. Bin 400 may be configured to move between a closed position and an open position relative to base 100. Carrier 600 may be configured to move through front opening of base 100. Bin 400 may be configured to move through at least one of left side opening of base 100 and right side opening of base 100. Bin 400 may be configured to move through left side opening of base 100 and right side opening of base 100. Bin 400 may be configured to rotate relative to base 100 through left side opening of base 100 and to rotate relative to base 100 through right side opening of base 100. Carrier 600 may be configured to slide relative to base 100 through front opening of base 100. Left bin 420*b* may be configured to move relative to carrier 600 through left side opening of base 100. Right bin 420*a* may be configured to move relative to carrier 600 through right side opening of base 100. Right bin 420*a* and left bin 420*b* may be configured to move with carrier 600 between the closed position of carrier 600 and the open position of carrier 600. Bin 400 may be configured to move with carrier 600 as carrier 600 moves between the closed position of carrier 600 and the open position of carrier 600. Storage compartment SC may be configured for accessibility when carrier 600 is in the open position of carrier 600 and when bin 400 is in the open position of bin 400.

According to an exemplary embodiment as shown schematically in FIG. 5A, carrier 600 may be configured to slide relative to base 100 between the closed position of carrier 600 and the open position of carrier 600. Bin 400 may be configured to rotate relative to base 100 between the closed position of bin 400 and the open position of bin 400. Bin 400 may be configured to move with carrier 600 as carrier 600 moves between the closed position of carrier 600 and the open position of carrier 600. The component may comprise a set of tracks 140. Set of tracks 140 may be configured to facilitate movement of carrier 600 between the closed position of carrier 600 and the open position of carrier 600. Latch 150 may be configured to couple carrier 600 to set of tracks 140 to facilitate movement of carrier 600 between the closed position of carrier 600 and the open position of carrier 600. Latch 150 may be configured to decouple carrier 600 and set of tracks 140. Hook 400*h* may be configured to couple bin 400 to carrier 600 as carrier 600 moves from the closed position of carrier 600 toward the open position of carrier 600. Bar 610 may be configured to provide a stop of movement for carrier 600. Hook 400*h* may be configured to engage bar 610 to couple bin 400 to carrier 600 as carrier 600 moves from the closed position of carrier 600 toward the open position of carrier 600. Bar 610 may be configured to contact base 100 as carrier 600 moves toward the closed position of carrier 600 to disengage bar 610 and hook 400*h*.

According to an exemplary embodiment as shown schematically in FIGS. 5A and 5B, latch 230 may be configured to latch bin 400 to base 100 and unlatch bin 400 from the base 100. Mechanism shown as bolt mechanism 800 may be configured to latch door or right door 200 to base 100 when carrier 600 moves from the closed position of carrier 600 toward the open position of carrier 600. Bar 240 may be configured to move between a locking position to lock door or right door 200 to base 100 and an unlocked position to unlock door or right door 200 from base 100. Side door inner 270 may comprise a surface 200*s* configured to move bin 400 relative to base 100. Bin 400 may comprise an edge 420*e*. The surface 200*s* of side door inner 270 may be configured to contact the edge 420*e* of bin 400 to move bin 400 toward the open position of bin 400. Bin 400 may comprise a projection 420*p*. Projection 420*p* may be configured to provide a stop of movement for bin 400. Projection 420*p* may be configured to block movement of carrier 600 from the closed position of carrier 600 toward the open position of carrier 600.

According to an exemplary embodiment as shown schematically in FIGS. 4A-4F, a hand may actuate latch 530 and pull on door 500 to move or slide left bin 420*b* and right bin 420*a* relative to base 100 between a closed position and an open position. As shown schematically in FIG. 4B, upon actuation of latch 530, cable 600 may actuate track engagement mechanism 150 to enable movement of left bin 420*b* and right bin 420*a* relative to base 100 between a closed position and an open position via track assembly 140. As shown schematically in FIGS. 4C-4F, when doors 200 are in closed positions, latch 530 is configured to move relative to projections 420*p*.

According to an exemplary embodiment as shown schematically in FIGS. 8A-8E, after actuation of latch 530, door 500 may be moved further toward the open position of door 500. Spring 122 of mechanism 800 may overcome a force provided by spring 260 to move plunger 124 and move bar 240 from an unlocked position as shown schematically in FIGS. 8A and 8D to a locked position as shown schematically in FIGS. 8B, 8C and 8E to latch door 200 to base 100. Mechanism 800 may be configured to block movement of bin 400 between the closed position of bin 400 and the second open position of bin 400 when carrier 600 moves from the closed position of carrier 600 toward the open position of carrier 600 as shown schematically in FIGS. 8A-8E. Mechanism 800 may comprise a bolt mechanism. Mechanism 800 may comprise a bar or bolt 240; bar 240 may be configured to move between a locked position as shown schematically in FIGS. 8B, 8C and 8E to block movement of bin 400 toward the second open position of bin 400 and an unlocked position as shown schematically in FIGS. 8A and 8D to enable movement of bin 400 between the closed position of bin 400 and the second open position of bin 400.

According to an exemplary embodiment as shown schematically in FIGS. 9A-9E, door 500 may be moved further toward the open position of door assembly. Hook 400*h* may be configured to couple bin 400 to bar 610 as carrier 600 moves from the closed position of carrier 600 toward the open position of carrier 600. Hook 400*h* may be configured to engage bar 610 to couple bin 400 to carrier 600. Mechanism 700 may be configured to allow movement of bin 400 between the closed position of bin 400 and the second open position of bin 400 when carrier 600 is in the closed position as shown schematically in FIGS. 9C and 12A-12C and to block movement of bin 400 relative to carrier 600 when carrier 600 is in the open position of carrier 600 as shown schematically in FIGS. 9D and 9E. Mechanism 700 may comprise a latch mechanism. Mechanism 700 may comprise a bar 610 coupled to carrier 600, a spring 620 coupled to carrier 600 and at least one hook 400*h* coupled to bin 400. Bar 610 may be configured to move relative to carrier 600 to block movement of bin 400 relative to carrier 600 when carrier 600 is in the open position of carrier 600 as shown schematically in FIGS. 9A-9E. Spring 620 may be configured to bias bar 610 to allow movement of bin 400 between the closed position of bin 400 and the second open position of bin 400 when carrier 600 is in the closed position as shown schematically in FIG. 9C. Bin 400 may comprise at least one hook 400*h*; the at least one hook 400*h* may be configured to couple bin 400 to carrier 600 as carrier 600 moves from the closed position of carrier 600 toward the open position of carrier 600. Bar 610 may be configured to engage the at least one hook 400*h* to couple bin 400 to carrier 600 as carrier 600 moves from the closed position of carrier 600 toward the open position of carrier 600. Bar 610 may be configured to contact base 100 as carrier 600 moves toward the closed position of carrier 600 to disengage bar 610 and the at least one hook 400*h*. Bar 610 may be configured to engage the at least one hook 400*h* to block movement of bin 400 relative to carrier 600.

According to an exemplary embodiment as shown schematically in FIGS. 10A-10E, 11A-11E and 12A-12F, a hand may actuate or depress latch 230 and pull on latch 230 to move or rotate door 200 relative to base 100 between a closed position and an open position. As shown schematically in FIGS. 10D, 10E and 14A-14B, surface 200*s* may be configured to move bin 420 relative to base 100. Surface 200*s* may be configured to contact edge 420*e* of bin 420 to move bin 420 toward the open position of bin 420. Surface 200*s* of door 200 for bin 420 may be configured to move bin 420 toward the second open position of bin 420 as shown schematically in FIGS. 12A-12C and 14A-14B. Surface 200*s* of door 200 for bin 420 may be configured to contact edge 420*e* of bin 420 to move bin 420 toward the second open position of bin 420. As shown schematically in FIGS. 12A, 12B and 12C, a gap G may be provided between surface 200*s* and edge 420*e* of bin 420 when bin 420 is in the closed position of bin 420 to allow bin 420 to move relative to door 200 toward the first open position of bin 420.

According to an exemplary embodiment as shown schematically in FIGS. 13A-13C and 14A-14D, right bin 420*a* may comprise a projection 420*p*. Projection 420*p* may move within an aperture 600*a* of carrier 600 to guide movement of right bin 420*a* relative to carrier 600. Projection 420*p* may be configured to provide a stop of movement for bin 400. Projection 420*p* may be configured to block movement of carrier 600 from the closed position of carrier 600 toward the open position of carrier 600. Projection 420p may be configured to block actuation of latch 530 to prevent movement of carrier 600 from the closed position of carrier 600 toward the open position of carrier 600. Latch 530 may comprise clearance for projection 420 to enable actuation of front door latch 530 when right bin 420a is in the closed position of right bin 420.

Figure 6:
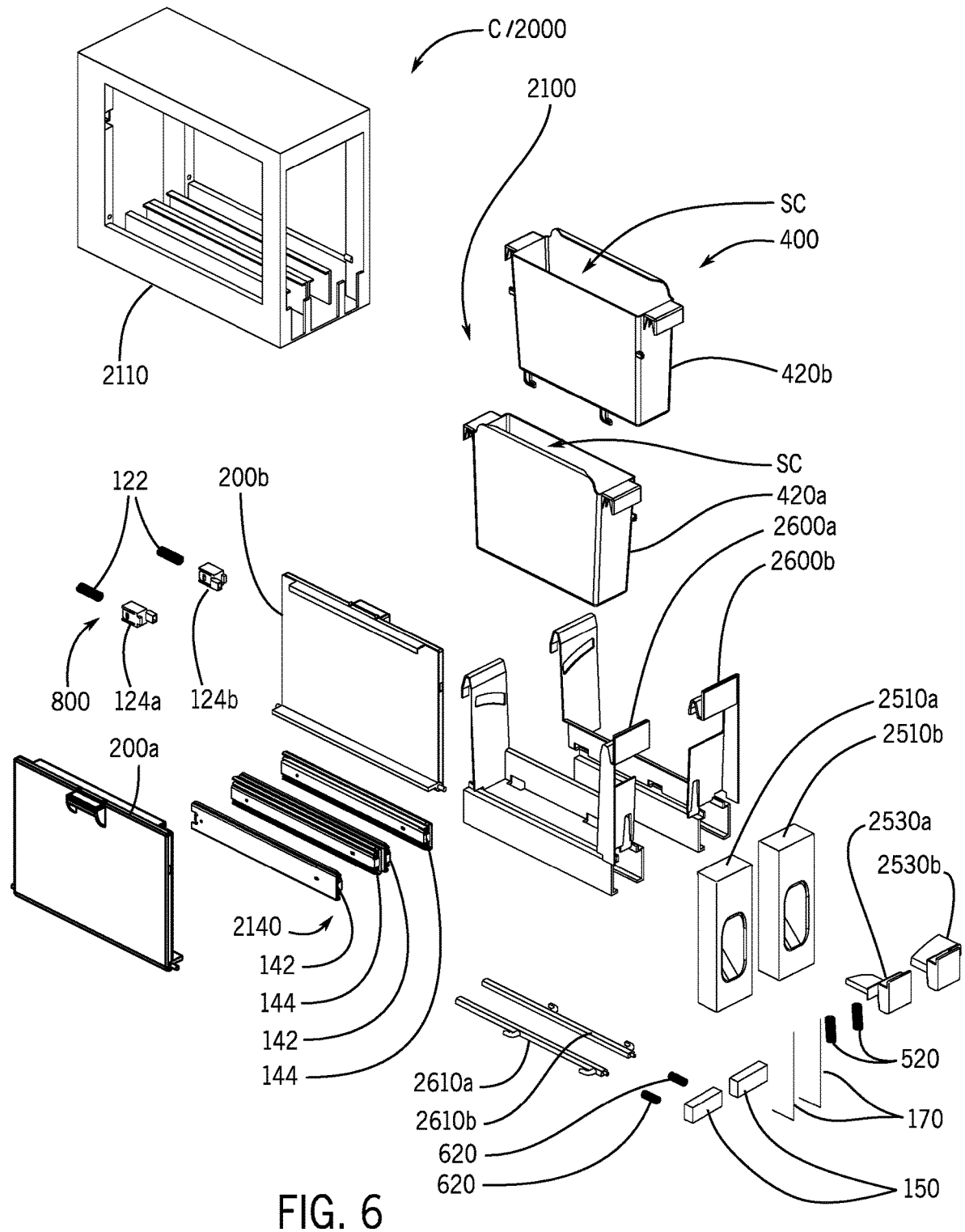
FIG. 6 is a schematic exploded perspective view of a vehicle interior component shown as a console assembly according to an exemplary embodiment.
Figure 7A:
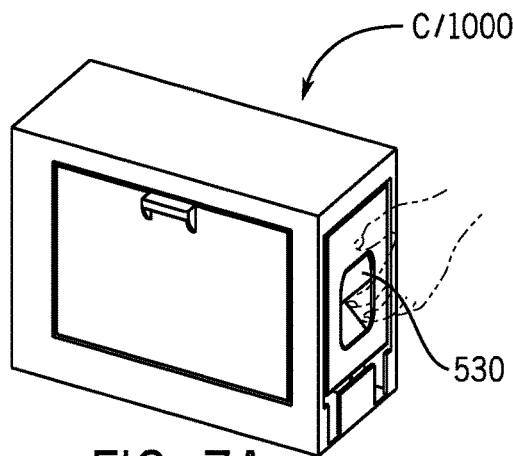
FIG. 7A is a schematic perspective view of a vehicle interior component shown as a console assembly according to an exemplary embodiment.
Figure 7B:
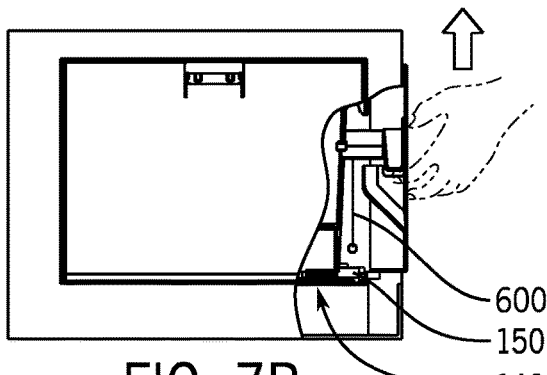
FIG. 7B is a schematic side view of a vehicle interior component shown as a console assembly according to an exemplary embodiment.
Figure 7C:
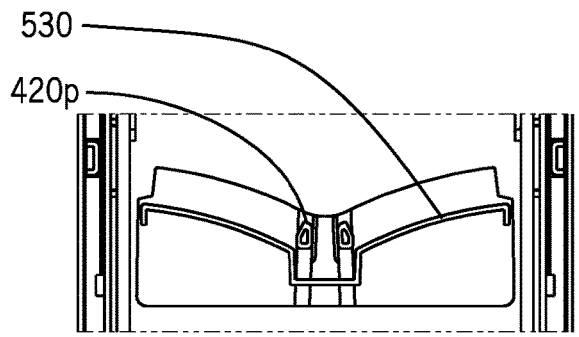
FIGS. 7C and 7D are schematic partial section views of a vehicle interior component shown as a console assembly according to an exemplary embodiment.
Figure 7D:
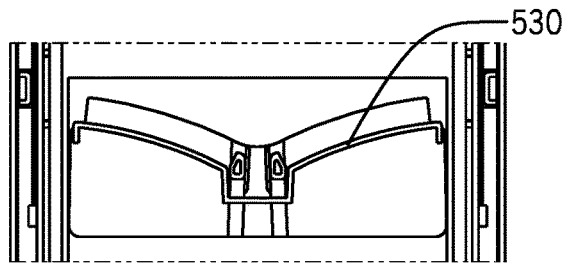
Figure 7E:
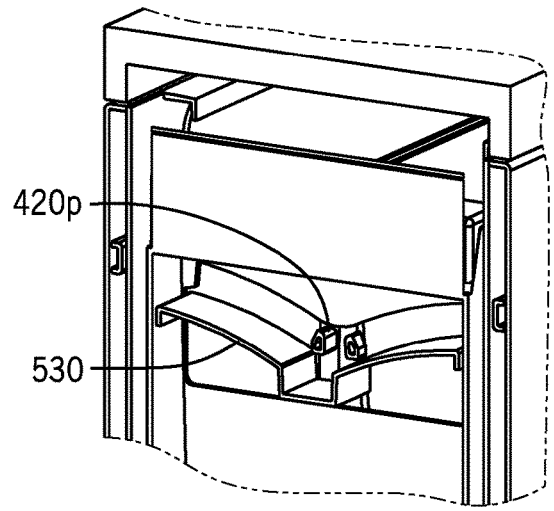
FIGS. 7E and 7F are schematic partial perspective views of a vehicle interior component shown as a console assembly according to an exemplary embodiment.
Figure 7F:
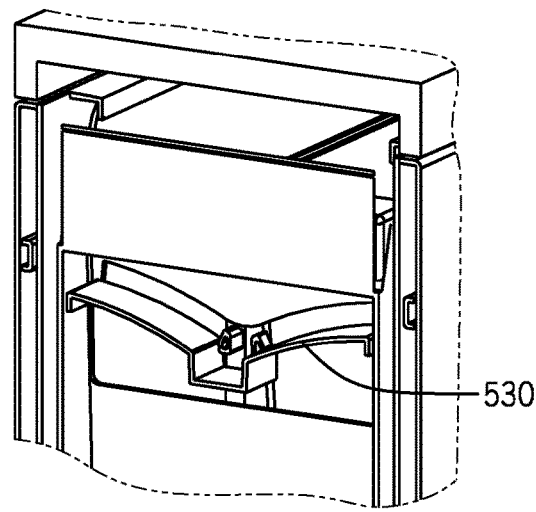

According to an exemplary embodiment as shown schematically in FIG. 6, a vehicle interior component C/2000 (e.g. console, floor console, center console, storage compartment, etc.) may comprise at least one of a base 2100, a door 200a, a door 200b, a left bin 420b, a right bin 420a, a right front door 2510a and a left front door 2510b. Base 2100 may comprise at least one of a base substrate 2110, a mechanism 800, a track assembly 2140, track engagement mechanisms 150, bars 2610a/b, cables 170, a right carrier 2600a and a left carrier 2600b. Base 2100 may comprise at least one of a right side opening, a left side opening and a front opening. Right front door 2510a may comprise a right front door latch 2530a. Left front door 2510b may comprise a left front door latch 2530b.

According to an exemplary embodiment as shown schematically in FIG. 6, right carrier 2600a may be configured to move between a closed position and an open position relative to base 2100. Left carrier 2600b may be configured to move between a closed position and an open position relative to base 2100. Right bin 420a may be configured to move between a closed position and an open position relative to base 2100 and right carrier 2600a. Left bin 420b may be configured to move between a closed position and an open position relative to base 2100 and left carrier 2600b. Right carrier 2600a/b may be configured to move through front opening of base 2100. Left carrier 2600b may be configured to move through front opening of base 2100. Right bin 420a may be configured to move through right side opening of base 2100. Right bin 420a may be configured to rotate relative to base 2100 through right side opening of base 2100. Left bin 420b may be configured to move through left side opening of base 2100. Left bin 420b may be configured to rotate relative to base 2100 through left side opening of base 2100. Right carrier 2600a/b may be configured to slide relative to base 2100 through front opening of base 2100. Left carrier 2600b may be configured to slide relative to base 2100 through front opening of base 2100. Right bin 420a and left bin 420b may be configured to move with right carrier 2600a and left carrier 2600b between the closed positions of right carrier 2600a and left carrier 2600b and the open positions of right carrier 2600a and left carrier 2600b.

EXEMPLARY EMBODIMENTS

According to an exemplary embodiment as shown schematically in FIGS. 1B, 2A-2D, 3A-3D and 4A-4D, a vehicle interior component C may comprise a base 100/2100 and a bin 400/420 configured for movement relative to the base 100/2100; the bin 400/420 may be configured to provide a closed position and an open position relative to the base 100/2100 for access to the bin 400/420; the open position of the bin 400/420 may comprise (a) a side access state and (b) an end access state; the bin 400/420 may be configured for movement relative to the base 100/2100 to provide the end access state.

The bin 400/420 may be configured for movement relative to the base 100/2100 to provide the side access state; the bin 400/420 may be configured for pivotal movement relative to the base 100/2100 to provide the side access state; the bin 400/420 may be configured for lateral movement relative to the base 100/2100 to provide the end access state. See e.g. FIGS. 2A-2D, 3A-3D and 4A-4D. The end access state may comprise at least one of (a) a front access state and/or (b) a rear access state. See e.g. FIGS. 2A and 2B.

The component may comprise a carrier 600/2600a/b for the bin 400/420; the carrier 600/2600a/b may be movable relative to the base 100/2100; the carrier 600/2600a/b may be configured to extend relative to the base 100/2100 to provide the front access state for the bin 400/420; the carrier 600/2600a/b may be configured to retract relative to the base 100/2100 for the closed position; the carrier 600/2600a/b may be configured to retract relative to the base 100/2100 for the side access state. See e.g. FIGS. 2A-2D, 3A-3D, 4A-4D, 5A and 6.

The base 100/2100 may comprise an end door assembly; the end door assembly may comprise a door 500 configured to open for the bin 400/420 in the end access state. The component may be configured so that the bin 400/420 is in an extended position relative to the base 100/2100 when in the end access state; the bin 400/420 is in a retracted position relative to the base 100/2100 when in the closed position; the bin 400/420 may be configured to extend through the door in the end access state. See e.g. FIGS. 2A-2D, 3A-3D and 4A-4D. The end door assembly may comprise two end doors. See e.g. FIGS. 4A-4D.

The base 100/2100 may comprise a side door assembly; the side door assembly may comprise a side door 200 configured to open for the bin 400/420 in the side access state; the bin 400/420 is in a retracted position relative to the base 100/2100 when in the side access state. See e.g. FIGS. 3D and 4D. The bin 400/420 may be configured to pivot with the side door 200 in the side access state. See e.g. FIGS. 3D and 4C-4D. The side door 200 may be configured to close for the closed position; the side door 200 may be configured to close for the end access state. See e.g. FIGS. 3A-3D and 4A-4D. The side door assembly may comprise two side doors. See e.g. FIGS. 4A-4D and 6. The bin 400/420 may comprise a compartment.

According to an exemplary embodiment as shown schematically in FIGS. 1B, 2A-2D, 3A-3D and 4A-4D, a vehicle interior component may comprise a base 100/2100 and a bin 400/420 configured for movement relative to the base 100/2100; the bin 400/420 may be configured to provide a closed position and an open position relative to the base 100/2100 for access to the bin 400/420; the open position of the bin 400/420 may comprise a side access state and an end access state; the bin 400/420 may be configured for movement relative to the base 100/2100 to provide the side access state; the bin 400/420 may be configured for movement relative to the base 100/2100 to provide the end access state; the end access state may comprise at least one of a front access state or a rear access state.

The base 100/2100 may comprise a side opening configured to provide the side access state. See e.g. FIGS. 3A-3D and 4A-4D. The bin 400/420 may be configured for pivoting movement relative to the base 100/2100 to provide the side access state; the bin 400/420 may be configured for translating movement relative to the base 100/2100 to provide the end access state.

The component may comprise a carrier 600/2600a/b for the bin 400/420 movable relative to the base 100/2100; the bin 400/420 may be configured to move with the carrier 600/2600a/b from the closed position toward the end access state of the open position; the bin 400/420 may be configured to move relative to the carrier 600/2600a/b between the closed position and the side access state of the open position. See e.g. FIGS. 2A-2D, 3A-3D and 4A-4D.

The component may comprise a mechanism configured (a) to allow movement of the bin 400/420 between the closed position and the end access state of the open position; and (b) to block movement of the bin 400/420 relative to the carrier 600/2600*a/b* in the open position. See e.g. FIGS. 5A, 6, 7A-7F, 13A-13D and 14A-14D.

The bin 400/420 may comprise at least one hook configured to couple the bin 400/420 to the carrier 600/2600*a/b* for movement from the closed position toward the open position. See e.g. FIGS. 5A, 6 and 9A-9B.

According to an exemplary embodiment shown schematically, the he component may comprise a mechanism configured to block movement of the bin 400/420 between the closed position and the side access state of the open position when the carrier 600/2600*a/b* moves toward the end access state of the open position. See e.g. FIGS. 5A, 6, 7A-7F, 13A-13D and 14A-14D.

According to an exemplary embodiment shown schematically, the he base 100/2100 may comprise an end opening and a side opening; the bin 400/420 may be configured to move through the end opening of the base 100/2100 in the end access state; the bin 400/420 may be configured to move through the side opening in the side access state. See e.g. FIGS. 3D and 4C-4D. The bin 400/420 may be configured (1) to slide through the front opening of the base 100/2100 and (2) to rotate through the side opening of the base 100/2100. See e.g. FIGS. 2A-2D, 3A-3D and 4A-4D. The side opening of the base 100/2100 may comprise a right side opening and a left side opening; the bin 400/420 may be configured to move through the right side opening of the base 100/2100 and the left side opening of the base 100/2100.

The component may comprise a carrier 600/2600*a/b* movable relative to the base 100/2100; the carrier 600/2600*a/b* may be configured to slide relative to the base 100/2100 through the end opening of the base 100/2100; the bin 400/420 may be configured to move with the carrier 600/2600*a/b* between the closed position and the open position; the bin 400/420 may be configured to move relative to the carrier 600/2600*a/b* through the side opening of the base 100/2100. See e.g. FIGS. 2A-2D, 3A-3D, 4A-4D, 5A and 6.

The component may comprise a mechanism configured (a) to allow movement of the bin 400/420 through the side opening of the base 100/2100 is in the closed position and (b) to block movement of the bin 400/420 relative to the carrier 600/2600*a/b* when in end access state of the open position. See e.g. FIGS. 2A-2D, 3A-3D and 4A-4D. The component may comprise a mechanism configured to block movement of the bin 400/420 through the side opening of the base 100/2100 when the carrier 600/2600*a/b* is moved toward the end access state of the open position. The component may comprise a door configured to provide the end access state and movable between a closed position and an open position relative to the base 100/2100; the door configured to provide the end access state may comprise a latch configured to latch the carrier 600/2600*a/b* to the base 100/2100 and unlatch the carrier 600/2600*a/b* from the base 100/2100. e.g. FIGS. 5A, 6, 7A-7B, 8A-8B, 9A-9B and 12A-12F. The bin 400/420 may comprise a projection; the projection of the bin 400/420 may be configured to block movement of the carrier 600/2600*a/b* toward the open position. See e.g. FIGS. 5A, 6, 7A-7F, 13A-13D and 14A-14D.

According to an exemplary embodiment shown schematically, the component may comprise a door configured to provide for the side access state and movable relative to the base 100/2100 between a closed position and an open position; the door configured to provide the side access state may comprise a latch configured to latch the door to the base 100/2100 and to unlatch the door from the base 100/2100. See e.g. FIGS. 5A, 6, 7A-7B, 8A-8B, 9A-9B and 12A-12F.

According to an exemplary embodiment shown schematically, the bin 400/420 may be configured (1) to slide relative to the base 100/2100 between the closed position and a translated position and (2) to rotate relative to the base 100/2100 between the closed position and a rotated position. See e.g. FIGS. 2A-2D, 3A-3D and 4A-4D.

According to an exemplary embodiment shown schematically, the component may comprise a blocking mechanism configured to block movement of the carrier 600/2600*a/b* relative to the base 100/2100 for the end access state when the bin 400/420 moves toward a rotated position for the side access state. See e.g. FIGS. 5A, 6, 7A-7F, 13A-13D and 14A-14D.

According to an exemplary embodiment as shown schematically in FIGS. 1B, 2A-2D, 3A-3D, 4A-4D, 5A and 6, a vehicle interior component C may comprise a base 100/2100 and a bin 400/420 configured for movement relative to the base 100/2100 and a carrier assembly 600/2600*a/b* for the bin/bin assembly 400/420; the bin 400/420 may be configured to provide a closed position and an open position relative to the base 100/2100 for access to the bin 400/420; the open position of the bin 400/420 may comprise (a) a side access state and (b) an end access state; the bin 400/420 may be configured for movement relative to the base 100/2100 to provide the side access state; the bin 400/420 may be configured for movement relative to the base 100/2100 to provide the end access state. The carrier assembly 600/2600*a/b* may comprise a carrier movable relative to the base 100/2100; the carrier 600/2600*a/b* may be configured to extend relative to the base 100/2100 to provide the end access state for the bin 400/420. See e.g. FIGS. 3A-3D, 4A-4D, 5A and 6. The carrier 600/2600*a/b* may be configured to retract relative to the base 100/2100 for at least one of (a) the closed position and/or (b) the side access state of the open position.

According to an exemplary embodiment shown schematically, the base 100/2100 may comprise an end door assembly; the end door assembly may comprise a door 500 configured to open for the bin 400/420 in the end access state.

According to an exemplary embodiment shown schematically, the component may be configured so that the bin 400/420 is in an extended position relative to the base 100/2100 when in the end access state; the bin 400/420 is in a retracted position relative to the base 100/2100 when in the closed position; the bin 400/420 may be configured to extend through the door in the end access state. See e.g. FIGS. 2A-2B, 3A-3C and 4A-4B and 4D.

According to an exemplary embodiment shown schematically, the base 100/2100 may comprise a side door assembly; the side door assembly may comprise a side door 200 configured to open for the bin 400/420 in the side access state. See e.g. FIGS. 2D, 3D and 4C-4D.

According to an exemplary embodiment shown schematically, the component may be configured so that the bin 400/420 is in a retracted position relative to the base 100/2100 when in the side access state. See e.g. FIGS. 2A-2D, 3A-3D and 4A-4D. The bin 400/420 may be configured to pivot with the side door 200 in the side access state. See e.g. FIGS. 3D and 4C-4D. The side door 200 may be configured to close for the closed position; the side door 200 may be configured to close for the front access state. See e.g. FIGS. 3C and 4B. The bin 400/420 may be configured for pivotal movement relative to the base 100/2100 to provide the side access state; the bin 400/420 may be configured for lateral movement relative to the base 100/2100 to provide the end access state. See e.g. FIGS. 2A-2B, 3A-3D and 4A-4D.

According to an exemplary embodiment shown schematically, the component may comprise at least one of (a) a console; (b) a floor console; (c) a center console; (d) a storage compartment. See e.g. FIGS. 1B and 2A-2D.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A vehicle interior component comprising:
a base; and
a bin configured for (a) a first state wherein the bin is secured to the base in a closed position and (b) a second state wherein the bin is moveable relative to the base;
wherein the bin is configured to move (1) in a first direction relative to the base from the closed position to a first open position and (2) in a second direction relative to the base from the closed position to a second open position and (3) relative to the base from the first open position to the closed position and (4) relative to the base from the second open position to the closed position and (5) relative to the base from the first open position to the closed position to the second open position and (6) relative to the base from the second open position to the closed position to the first open position.

2. The component of claim 1 wherein the bin is configured to slide in the first direction and to rotate in the second direction.

3. The component of claim 1 comprising a carrier movable between a closed position and an open position relative to the base; wherein the bin is configured to move with the carrier in the first direction between the closed position of the carrier and the open position of the carrier; wherein the bin is configured to move relative to the carrier between the closed position of the bin and the second open position of the bin.

4. The component of claim 3 further comprising a mechanism; wherein the mechanism is configured (a) to allow movement of the bin between the closed position of the bin and the second open position of the bin when the carrier is in the closed position and (b) to block movement of the bin relative to the carrier when the carrier is in the open position of the carrier.

5. The component of claim 3 wherein the bin comprises at least one hook; wherein the at least one hook is configured to couple the bin to the carrier as the carrier moves from the closed position of the carrier toward the open position of the carrier.

6. The component of claim 3 comprising a mechanism; wherein the mechanism is configured to block movement of the bin between the closed position of the bin and the second open position of the bin when the carrier moves from the closed position of the carrier toward the open position of the carrier.

7. The component of claim 1 comprising at least one of (a) a console; (b) a floor console; (c) a center console; (d) a storage compartment.

8. A vehicle interior component comprising:
a base; and
a carrier movable between a closed position and an open position relative to the base;
a bin configured for (a) a first state wherein the bin is secured to the base in a closed position and (b) a second state wherein the bin is moveable relative to the base;
wherein the bin is configured (1) to slide relative to the base between the closed position and a translated position and (2) to rotate relative to the base between the closed position and a rotated position;
wherein the carrier is configured to slide relative to the base;

wherein the bin is configured to move with the carrier between the closed position of the carrier and the open position of the carrier;

wherein the bin is configured to move relative to the carrier between the closed position of the bin and the rotated position of the bin.

9. The component of claim 8 wherein the translated position of the bin comprises an end access state and the rotated position of the bin comprises a side access state.

10. The component of claim 8 further comprising a mechanism; wherein the mechanism is configured (a) to allow movement of the bin between the closed position of the bin and the rotated position of the bin when the carrier is in the closed position and (b) to block movement of the bin relative to the carrier when the carrier is in the open position of the carrier.

11. The component of claim 8 comprising a blocking mechanism; wherein the blocking mechanism is configured to block movement of the carrier relative to the base when the bin moves toward the rotated position of the bin.

12. A vehicle interior component comprising:
a base;
a bin configured for movement relative to the base;
wherein the bin is configured to provide a closed position and an open position relative to the base for access to the bin;
wherein the open position of the bin comprises (a) a side access state and (b) an end access state;
wherein the bin is configured for movement relative to the base to provide the end access state;
wherein the base comprises a side door assembly;
wherein the bin is configured to pivot with the side door assembly in the side access state.

13. The component of claim 12 wherein the bin is configured for pivotal movement relative to the base to provide the side access state.

14. The component of claim 12 wherein the bin is configured for lateral movement relative to the base to provide the end access state.

15. The component of claim 12 wherein the end access state comprises at least one of (a) a front access state and/or (b) a rear access state.

16. The component of claim 12 further comprising a carrier for the bin; wherein the carrier is movable relative to the base.

17. The component of claim 16 wherein the carrier is configured to extend relative to the base to provide the front access state for the bin; wherein the carrier is configured to retract relative to the base for the closed position.

18. The component of claim 12 wherein the base comprises an end door assembly; wherein the end door assembly comprises a door configured to open for the bin in the end access state.

19. The component of claim 12 wherein the bin is constrained for movement (1) relative to the base from the closed position to a first open position for the end access state and (2) relative to the base from the closed position to a second open position for the side access state and (3) relative to the base from the first open position for the end access state to the closed position and (4) relative to the base from the second open position for the side access state to the closed position (5) relative to the base from the first open position for the end access state to the closed position to the second open position for the side access state and (6) relative to the base from the second open position for the side access state to the closed position to the first open position for the end access state.

20. The component of claim 12 wherein the side door assembly comprises two side doors.

* * * * *